(12) United States Patent
Quigley et al.

(10) Patent No.: US 10,492,570 B2
(45) Date of Patent: Dec. 3, 2019

(54) ADJUSTABLE SURFACE FOR USE IN MANUFACTURING SHOE PARTS

(71) Applicant: NIKE, Inc., Beaverton, OR (US)

(72) Inventors: Mike F. Quigley, Orange City, FL (US); Dragan Jurkovic, Taichung (TW); Kuo-Hung Lee, Douliu (TW); Yen-Hsi Liu, Chiayi County (TW)

(73) Assignee: NIKE, INC., Beaverton, OR (US)

( * ) Notice: Subject to any disclaimer, the term of this patent is extended or adjusted under 35 U.S.C. 154(b) by 112 days.

(21) Appl. No.: 15/812,704

(22) Filed: Nov. 14, 2017

(65) Prior Publication Data

US 2018/0064214 A1 Mar. 8, 2018

Related U.S. Application Data

(62) Division of application No. 14/162,275, filed on Jan. 23, 2014, now Pat. No. 9,901,142.

(51) Int. Cl.
*B23P 19/00* (2006.01)
*A43D 63/00* (2006.01)
(Continued)

(52) U.S. Cl.
CPC ............. *A43D 63/00* (2013.01); *A43D 91/00* (2013.01); *A43D 119/00* (2013.01);
(Continued)

(58) Field of Classification Search
CPC ........... B23P 11/00; B23P 19/00; B23P 19/04; B23Q 1/03; B23Q 1/25; B23Q 3/06
See application file for complete search history.

(56) References Cited

U.S. PATENT DOCUMENTS 1,989,680 A 2/1935 Carver et al.
2,010,407 A 8/1935 Matthias
(Continued)

FOREIGN PATENT DOCUMENTS

CN 2420256 Y 2/2001
CN 200991818 Y 12/2007
(Continued)

OTHER PUBLICATIONS

Extended Search Report dated Oct. 16, 2018 in European Patent Application No. 18000196.0, 6 pages.
(Continued)

*Primary Examiner* — Lee D Wilson
(74) *Attorney, Agent, or Firm* — Shook, Hardy & Bacon L.L.P.

(57) ABSTRACT

Manufacturing of a shoe or a portion of a shoe is enhanced by executing various shoe-manufacturing processes in an automated manner. For example, shoe parts may be retrieved and temporarily assembled according to preset relative positions to form part stacks. The part stacks may be retrieved with the relative positioning of the shoe parts being maintained and placed at a stitching machine for more permanent attachment via stitching of the parts to form a shoe assembly. Movement during stitching of a conveyance mechanism that transfers the part stack from the stacking surface to the stitching machine and movement of a needle associated with the stitching machine may be controlled by a shared control mechanism such that the movements are synchronized with respect to one another. Vision systems may be leveraged to achieve movement and position information between and at machines and locations.

7 Claims, 21 Drawing Sheets

(51) Int. Cl.
  *A43D 91/00* (2006.01)
  *A43D 119/00* (2006.01)
  *B25B 11/00* (2006.01)
  *B25J 11/00* (2006.01)
(52) U.S. Cl.
  CPC ............ *B25B 11/005* (2013.01); *B25J 11/00* (2013.01); *A43D 2200/10* (2013.01); *A43D 2200/50* (2013.01); *A43D 2200/60* (2013.01)

(56) References Cited

U.S. PATENT DOCUMENTS

| | | | |
|---|---|---|---|
| 3,530,521 A | | 9/1970 | Alberto et al. |
| 3,868,102 A | * | 2/1975 | Pevar .................. B25B 1/2421 269/26 |
| 3,868,736 A | | 3/1975 | Adamik |
| 4,092,141 A | | 5/1978 | Frank et al. |
| 4,109,334 A | | 8/1978 | Bungert et al. |
| 4,449,264 A | | 5/1984 | Schwartz |
| 4,454,618 A | | 6/1984 | Curchod |
| 4,498,404 A | | 2/1985 | Sadeh |
| 4,510,636 A | | 4/1985 | Phillips |
| 4,517,696 A | | 5/1985 | Schartz |
| 4,704,974 A | | 11/1987 | Herdeg et al. |
| 4,876,758 A | | 10/1989 | Rolloff et al. |
| 4,936,560 A | | 6/1990 | Barozzi |
| 5,137,263 A | * | 8/1992 | Savoie ................. B25B 1/2405 269/154 |
| 5,364,083 A | | 11/1994 | Ross et al. |
| 5,901,426 A | * | 5/1999 | Okazaki ............ B23K 37/0443 29/407.08 |
| 5,941,835 A | | 8/1999 | Sundman |
| 5,988,618 A | | 11/1999 | Meintrup et al. |
| 6,202,275 B1 | | 3/2001 | Cioletti et al. |
| 6,209,188 B1 | | 4/2001 | Soderberg et al. |
| 6,250,619 B1 | | 6/2001 | Cook et al. |
| 6,263,815 B1 | | 7/2001 | Furudate |
| 6,299,151 B1 | * | 10/2001 | Smith .................. B23O 1/0018 269/24 |
| 6,499,513 B1 | | 12/2002 | Couch |
| 6,654,705 B1 | | 11/2003 | Benson et al. |
| 6,799,757 B1 | | 10/2004 | Lang |
| 7,346,998 B2 | | 3/2008 | Tadin et al. |
| 7,610,790 B2 | | 11/2009 | Halford |
| 8,393,605 B2 | * | 3/2013 | Yang ..................... B25B 5/003 269/287 |
| 8,534,728 B1 | | 9/2013 | Bosscher et al. |
| 8,826,506 B2 | * | 9/2014 | Park .................... B62D 65/026 29/278 |
| 9,186,777 B2 | * | 11/2015 | Woods ................... B25B 11/02 |
| 9,447,532 B2 | | 9/2016 | Jurkovic et al. |
| 9,552,915 B2 | | 1/2017 | Khan et al. |
| 9,676,497 B2 | * | 6/2017 | Boyd ..................... B21D 53/92 |
| 9,901,142 B2 | * | 2/2018 | Quigley ................ A43D 63/00 |
| 9,986,788 B2 | * | 6/2018 | Jurkovic ............ A43D 111/006 |
| 2002/0105296 A1 | | 8/2002 | Okuyama et al. |
| 2006/0108729 A1 | | 5/2006 | Siegel |
| 2008/0147219 A1 | | 6/2008 | Jones et al. |
| 2008/0276476 A1 | | 11/2008 | Stephen et al. |
| 2009/0057971 A1 | * | 3/2009 | Bumgarner ............ B23O 1/035 269/21 |
| 2009/0061153 A1 | | 3/2009 | De Luca et al. |
| 2009/0183389 A1 | | 7/2009 | Miller et al. |
| 2011/0291342 A1 | * | 12/2011 | Gindy ................... B25B 1/2421 269/266 |
| 2013/0125319 A1 | | 5/2013 | Regan |
| 2013/0131853 A1 | | 5/2013 | Regan et al. |
| 2013/0131854 A1 | | 5/2013 | Regan et al. |
| 2013/0334753 A1 | * | 12/2013 | Stanifer ................ B23O 3/069 269/32 |
| 2015/0201710 A1 | * | 7/2015 | Jurkovic ................ A43D 63/00 12/123 |
| 2015/0201711 A1 | * | 7/2015 | Jurkovic ............ A43D 111/006 12/103 |
| 2018/0064214 A1 | * | 3/2018 | Quigley ................ A43D 63/00 |

FOREIGN PATENT DOCUMENTS

| | | |
|---|---|---|
| CN | 101286061 A | 10/2008 |
| EP | 0188654 A1 | 9/1984 |
| EP | 1902640 A1 | 3/2008 |
| GB | 120058 | 10/1918 |
| GB | 1315001 A | 4/1973 |
| TW | 201528986 A | 8/2015 |
| WO | 2011054999 A1 | 5/2011 |

OTHER PUBLICATIONS

Notice of Allowance dated Jan. 26, 2018 in U.S. Appl. No. 15/268,925, 11 pages.

Extended Search Report dated Jan. 17, 2019 in European Patent Application No. 18190349.3, 7 pages.

\* cited by examiner

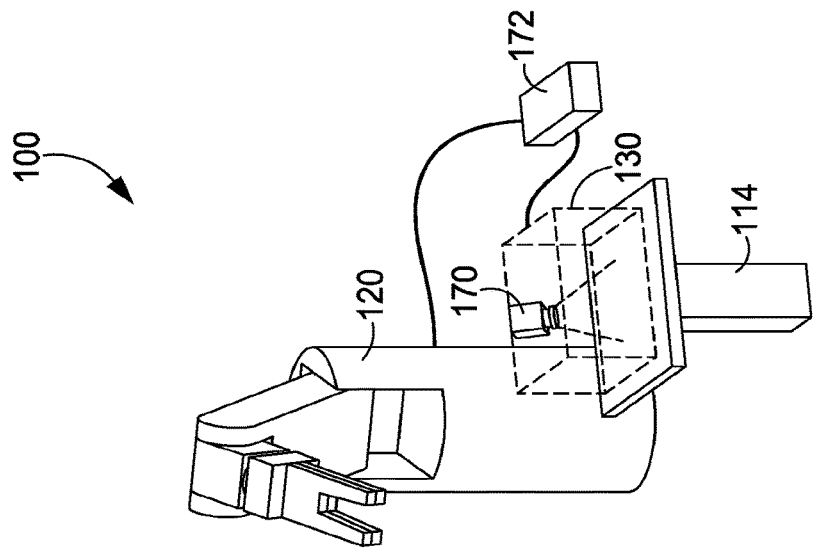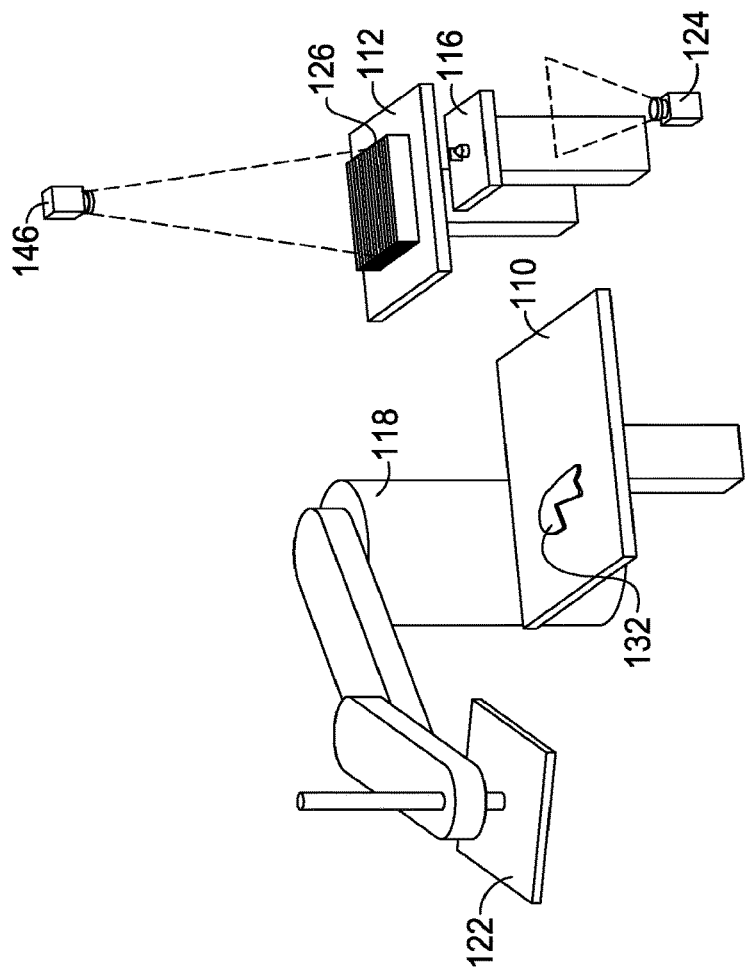
FIG. 3

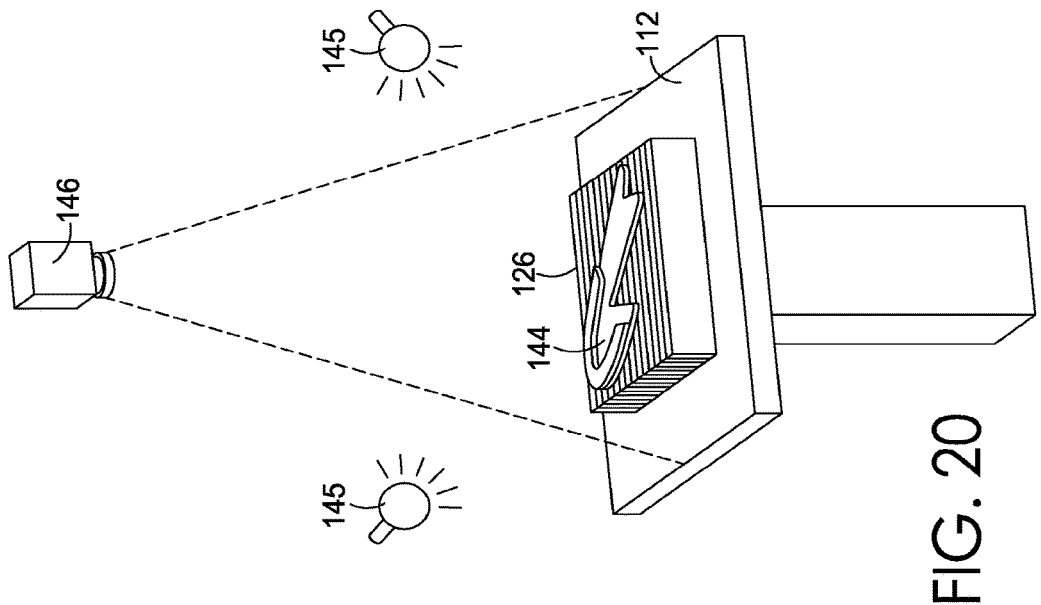
FIG. 20
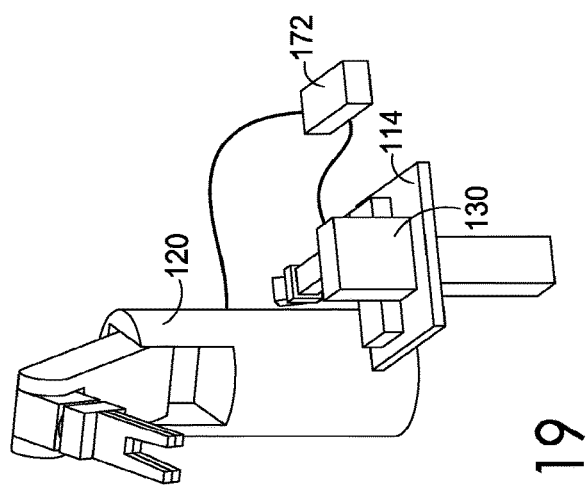
FIG. 19
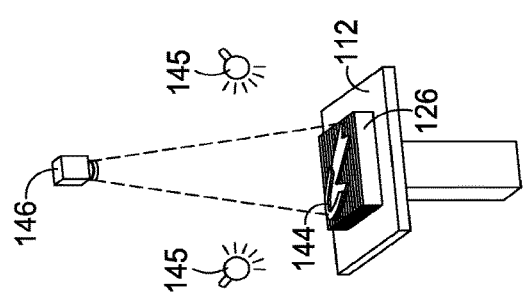

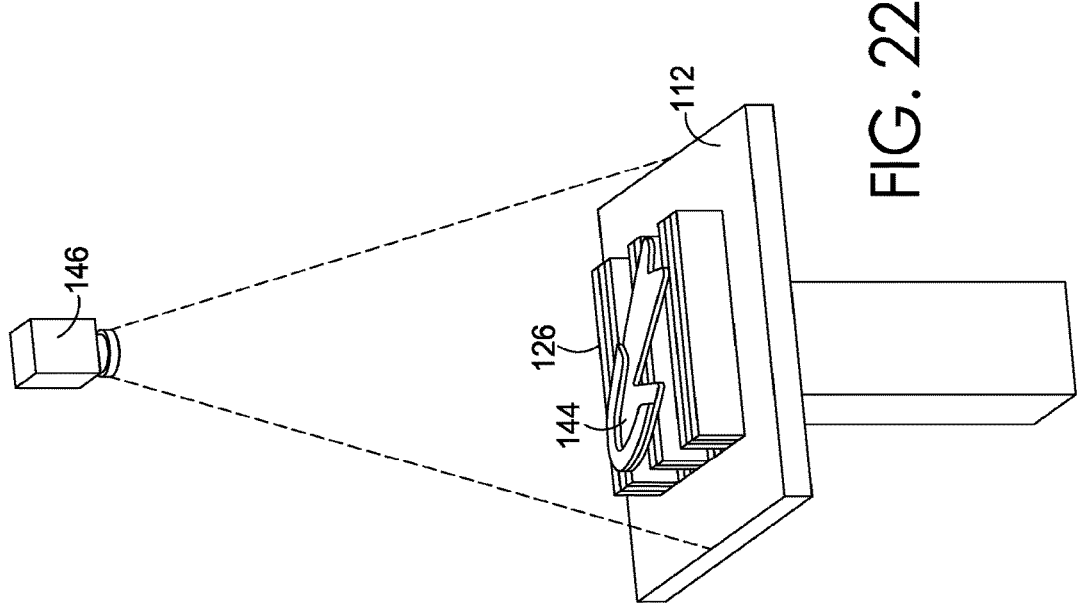

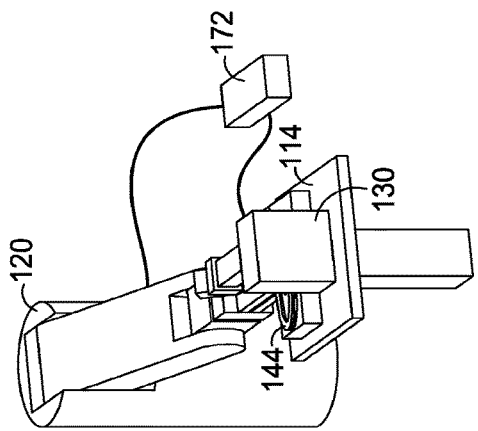
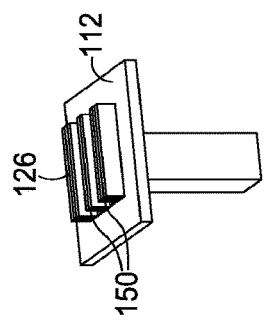
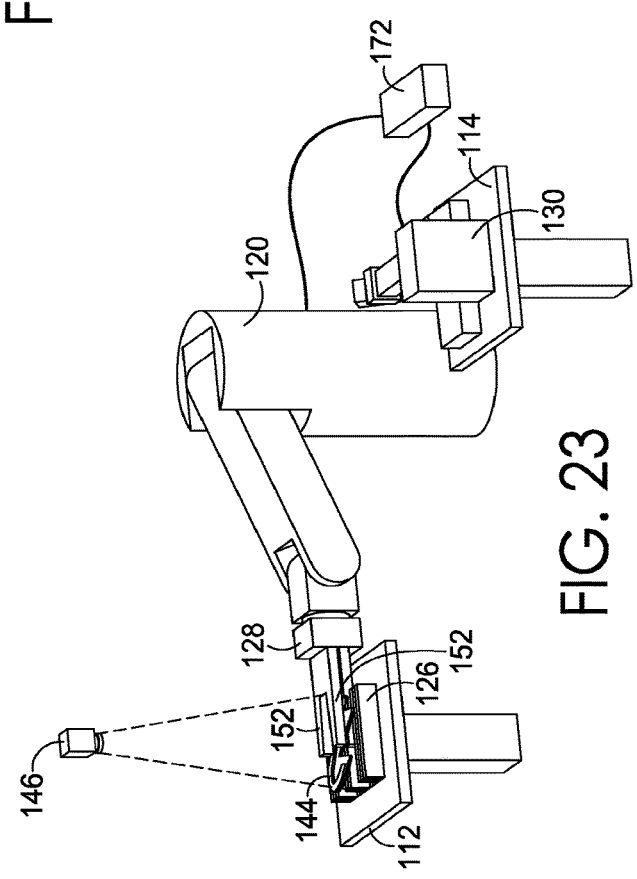
FIG. 23
FIG. 24

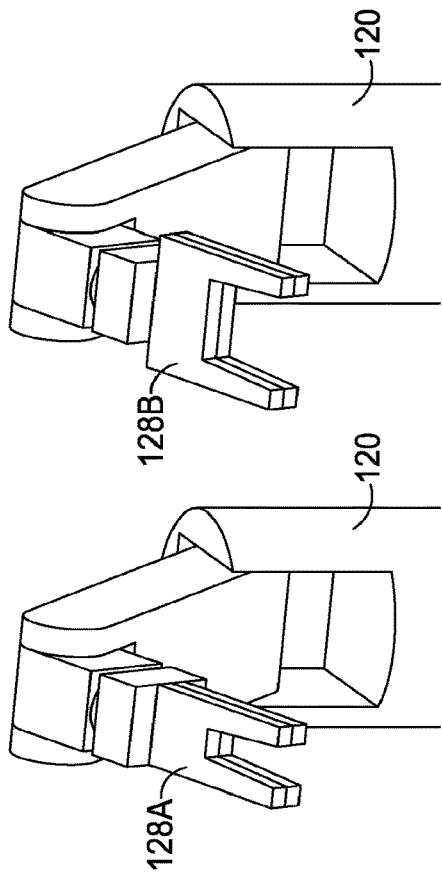
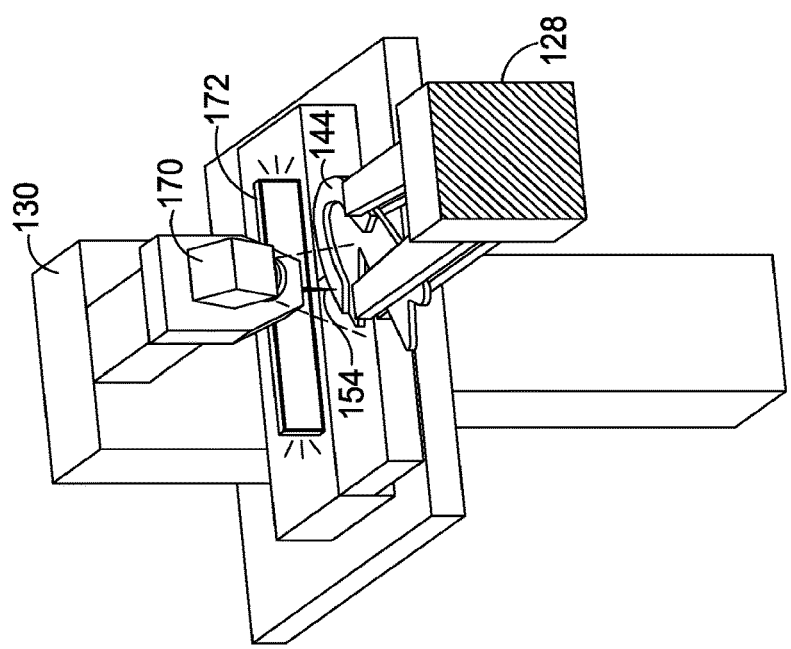

ADJUSTABLE SURFACE FOR USE IN MANUFACTURING SHOE PARTS

CROSS-REFERENCE TO RELATED APPLICATIONS

This application having U.S. patent application Ser. No. 15/812,704, entitled "ADJUSTABLE SURFACE FOR USE IN MANUFACTURING SHOE PARTS" is a divisional of U.S. patent application Ser. No. 14/162,275, filed on 23 Jan. 2014, which is related by subject matter to U.S. Pat. No. 9,447,532, entitled "AUTOMATED ASSEMBLY AND STITCHING OF SHOE PARTS," filed on 23 Jan. 2014, which are incorporated by reference as if set forth in their entirety herein.

STATEMENT REGARDING FEDERALLY SPONSORED RESEARCH OR DEVELOPMENT

Not applicable.

TECHNICAL FIELD

The present invention relates to the automated manufacturing of shoes. More particularly, the present invention relates to the assembly and stitching of parts of a shoe, for instance, shoe parts that collectively form all of part of a shoe upper, in an automated manner.

BACKGROUND

Manufacturing a shoe typically requires a number of assembly steps, such as cutting, forming, assembling, adhering, and/or stitching several shoe parts together. Some methods of completing these steps, such as those that rely heavily on manual execution, may be resource intensive and may have a high rate of variability.

SUMMARY

This Summary provides a high-level overview of the disclosure and of various aspects of the invention and introduces a selection of concepts that are further described in the Detailed Description below. This Summary is not intended to identify key features or essential features of the claimed subject matter, nor is it intended to be used as an aid in isolation to determine the scope of the claimed subject matter.

In brief and at a high level, this disclosure describes, among other things, assembly and stitching of parts of a shoe in an automated fashion. For example, individual shoe parts (e.g., shoe parts that collectively form all or part of a shoe upper assembly) may be retrieved and temporarily assembled at a stacking station according to preset relative positions to form part stacks. The part stacks may be retrieved with the relative positioning of the shoe parts being maintained and placed at a stitching machine for more permanent attachment via stitching of the parts to form a shoe assembly. Movement during stitching of a conveyance mechanism that transfers the part stack from the stacking surface to the stitching machine and movement of a needle associated with the stitching machine may be controlled by a shared control mechanism such that the movements are synchronized with respect to one another.

An exemplary system that assembles and stitches shoe parts in an automated fashion may be comprised of various components, such as manufacturing stations, conveyance mechanisms, vision systems and a shared control system. In one exemplary aspect, the system includes a first conveyance mechanism having an associated first pick-up tool that may retrieve shoe parts from at least one manufacturing station and transfer the retrieved shoe parts to another manufacturing station that includes a stacking surface at which the retrieved shoe parts are situated, at least one shoe part overlapping at least a portion of another shoe part at a preset relative position to form a part stack. A first vision system may determine a position of the shoe parts retrieved by the first conveyance mechanism relative to the first pick-up tool, the position information being used to aid in situating of the shoe parts at the stacking surface. A second vision system may determine a position of individual ones of the retrieved shoe parts relative to the stacking surface and may determine a position of the part stack relative to the stacking surface. A second conveyance mechanism that includes an associated second pick-up tool may retrieve the part stack from the stacking surface and transfer the stack to yet another manufacturing station, this one including a stitching machine that may stitch together at least part of the overlapping portions of the shoe parts included in the part stack. The second vision system may determine a position of the retrieved part stack relative to the second pick-up tool and the second conveyance mechanism may position the part stack in position for stitching relative to a needle associated with the stitching machine. A shared control system uses a processor, which communicates with computer-storage media, and may synchronize movement of the part stack relative to the stitching machine needle by the second conveyance mechanism with movement of the needle during stitching.

An exemplary method for assembling and stitching shoe parts in an automated manner may comprise various steps. For instance, a first shoe part may be retrieved utilizing a first conveyance mechanism that includes a first pick-up tool. Utilizing a first vision system, a position of the first shoe part relative to the first pick-up tool may be determined, and utilizing a second vision system, a position of a base shoe part relative to a stacking surface may be determined. Using the position of the first shoe part relative to the first pick-up tool and the position of the base shoe part relative to the stacking surface, the first shoe part may be situated on the stacking surface such that at least a portion of the first shoe part overlaps at least a portion of the base shoe part at a preset relative position to form a part stack. Utilizing the second vision system, a position of the part stack relative to the stacking surface may be determined. The part stack may be retrieved from the stacking surface utilizing a second conveyance mechanism that includes a second pick-up tool and the part stack may be situated at a stitching machine. At least part of the overlapping portions of the first shoe part and the base shoe part may be stitched together. Movement, by the second conveyance mechanism, of the part stack relative to the stitching machine and movement of a needle associated with the stitching machine may be controlled by a shared control system such that the respective movements are synchronized.

In a further exemplary method for assembling and stitching shoe parts in an automated fashion, a first shoe part may be retrieved utilizing a first conveyance mechanism that includes a first pick-up tool. Utilizing a first vision system, a position of the first shoe part relative to the first pick-up tool may be determined and the first shoe part may be situated at a stacking surface. Utilizing a second vision system, a position of the first shoe part relative to the stacking surface may be determined. Again utilizing the first conveyance mechanism, a second shoe part may be retrieved and, utilizing the first vision system, a position of the second shoe part relative to the first pick-up tool may be determined. An adhesive may be applied to at least part of the second shoe part. Utilizing the position of the first shoe part relative to the stacking surface and the position of the second shoe part relative to the first pick-up tool, the second shoe part may be situated at the stacking surface such that at least a portion of the second shoe part overlaps at least a portion of the first shoe part at a preset relative position to form a part stack, the portion of the second shoe part that overlaps the portion of the first shoe part including the part of the second shoe part to which adhesive was applied. Utilizing the second vision system, a position of the part stack relative to the stacking surface may be determined and the part stack may be retrieved from the stacking surface utilizing a second conveyance mechanism that includes a second pick-up tool. The part stack may be situated at a stitching machine and at least a part of the overlapping portions of the first shoe part and the second shoe part may be stitched together. Movement, by the second conveyance mechanism, of the part stack relative to the stitching machine and movement of a needle associated with the stitching machine may be controlled by a shared control system such that the respective movements are synchronized.

In aspects, the stacking surface utilized in the above-described systems and methods may comprise an adjustable surface for use in the automated manufacture of shoe parts. The adjustable surface may include a support structure having a substantially planar support surface and a plurality of adjustable members coupled with the support structure. Each of the plurality of members may be independently adjustable in at least one direction relative to the planar support surface.

Aspects further relate to an exemplary method for manufacturing shoe parts in an automated manner that may include situating a first shoe part on a substantially planar top surface, the top surface being formed by a plurality of adjustable members supported by a substantially planar support surface when each of the plurality of adjustable members is in an extended position. The method further may include adjusting one or more of the plurality of members into a retracted position creating at least one opening for receiving a shoe processing tool, wherein the shoe part remains substantially in position upon the one or more members being adjusted.

BRIEF DESCRIPTION OF THE DRAWINGS

Illustrative aspects of the present invention are described in detail below with reference to the attached drawing figures, which are incorporated by reference herein, and wherein:

FIGS. 3-26 are schematic diagrams sequentially illustrating the exemplary assembly and stitching together of two shoe parts, in accordance with aspects of the present invention. More particularly, FIG. 3 is a schematic diagram of a perspective view of an exemplary system for assembling and stitching shoe parts in an automated manner, the system having a first shoe part situated at a first manufacturing station, in accordance with aspects of the present invention;

FIG. 4 is a schematic diagram of a perspective view of a first stage of the exemplary system of FIG. 3, depicting a first pick-up tool associated with a first conveyance mechanism retrieving the first shoe part shown in FIG. 3, in accordance with aspects of the present invention;

FIG. 5 is a schematic diagram of a perspective view of a vacuum plate as an exemplary first pick-up tool that may be used in accordance with aspects of the present invention, the vacuum plate having retrieved the first shoe part of FIG. 3;

FIG. 6 is a schematic diagram of a perspective view of the first stage of the exemplary system of FIG. 3, depicting examination by a first vision system of the first shoe part retrieved by the first pick-up tool, in accordance with aspects of the present invention;

FIG. 7 is a schematic diagram of a perspective view of the first stage of the exemplary system of FIG. 3, depicting the first pick-up tool passing through an adhesive applying station, in accordance with aspects of the present invention;

FIG. 8 is a schematic diagram of a side view of the adhesive applying station of FIG. 7, depicting that as the shoe part being processed by the system of FIGS. 3-9 is a first or base shoe part, no adhesive is applied thereto, in accordance with aspects of the present invention;

FIG. 9 is a schematic diagram of a perspective view of the first stage of the exemplary system of FIG. 3, depicting the situating, by the first pick-up tool, of the first shoe part at a part stacking surface, in accordance with aspects of the present invention;

FIG. 10 is a schematic diagram of a perspective view of the first stage of the exemplary system of FIG. 3, depicting the first shoe part situated at the part stacking surface and a second shoe part situated at the first manufacturing station, in accordance with aspects of the present invention;

FIG. 11 is a schematic diagram of a perspective view of the first stage of the exemplary system of FIG. 3, depicting the first pick-up tool retrieving the second shoe part shown in FIG. 10 from the first manufacturing station, in accordance with aspects of the present invention;

FIG. 12 is a schematic diagram of a perspective view of a vacuum plate as an exemplary first pick-up tool that may be used in accordance with aspects of the present invention, the vacuum plate having retrieved the second shoe part of FIG. 10;

FIG. 13 is a schematic diagram of a perspective view of the first stage of the exemplary system of FIG. 3, depicting examination by the first vision system of the second shoe part retrieved by the first pick-up tool, in accordance with aspects of the present invention;

FIG. 14 is a schematic diagram of a perspective view of the first stage of the exemplary system of FIG. 3, depicting the first pick-up tool passing through the adhesive applying station, in accordance with aspects of the present invention;

FIG. 17 is a schematic diagram illustrating a perspective view of the first stage of the exemplary system of FIG. 3, depicting the situating, by the first pick-up tool, of the second shoe part at the stacking table at a preset position relative to the first shoe part, in accordance with aspects of the present invention;

FIG. 18 is a schematic diagram of a perspective view of the first stage of the exemplary system of FIG. 3, depicting the second shoe part situated over a portion of the first shoe part, at the pre-set position relative to the first shoe part, upon release of the second shoe part by the first pick-up tool creating a part stack, in accordance with aspects of the present invention;

FIG. 19 is a schematic diagram of a perspective view of the second stage of the exemplary system of FIG. 3 depicting examination by the second vision system of the part stack at the stacking station, in accordance with aspects of the present invention;

FIG. 20 is a schematic diagram of a perspective view depicting examination by the second vision system of the part stack at the second manufacturing or stacking station, in accordance with aspects of the present invention;

FIG. 22 shows a schematic diagram of a perspective view depicting examination by the second vision system of the part stack at the stacking station subsequent to various adjustable members thereof have been moved to the "down" position, illustrating that the part stack remains substantially in position upon one or more of the adjustable members being adjusted, in accordance with aspects of the present invention;

FIG. 23 is a schematic diagram of a perspective view of the second stage of the exemplary system of FIG. 3 depicting a second pick-up tool associated with a second conveyance mechanism retrieving the part stack from the stacking table utilizing the openings created by member adjustments made to the stacking surface, in accordance with aspects of the present invention;

FIG. 24 is a schematic diagram of a perspective view of the second stage of the exemplary system of FIG. 3, depicting the situating, by the second pick-up tool, of the part stack at a stitching machine, in accordance with aspects of the present invention;

FIG. 25 is a schematic diagram of a perspective view of the second stage of the exemplary system of FIG. 3 depicting stitching of the part stack by the stitching machine while the part stack is being moved in accordance with an appropriate stitching pattern by the second conveyance mechanism, in accordance with aspects of the present invention;

FIGS. 26A and 26B are perspective views of the second pick-up tool illustrating the changeable nature thereof, in accordance with aspects of the present invention;

DETAILED DESCRIPTION

The subject matter of certain aspects of the present invention is described with specificity herein to meet statutory requirements. But the description itself is not intended to define what is regarded as an invention, which is what the claims do. The claimed subject matter may comprise different elements or combinations of elements similar to the ones described in this document, in conjunction with other present or future technologies. Terms should not be interpreted as implying any particular order among or between various elements herein disclosed unless explicitly stated.

Figure 1:
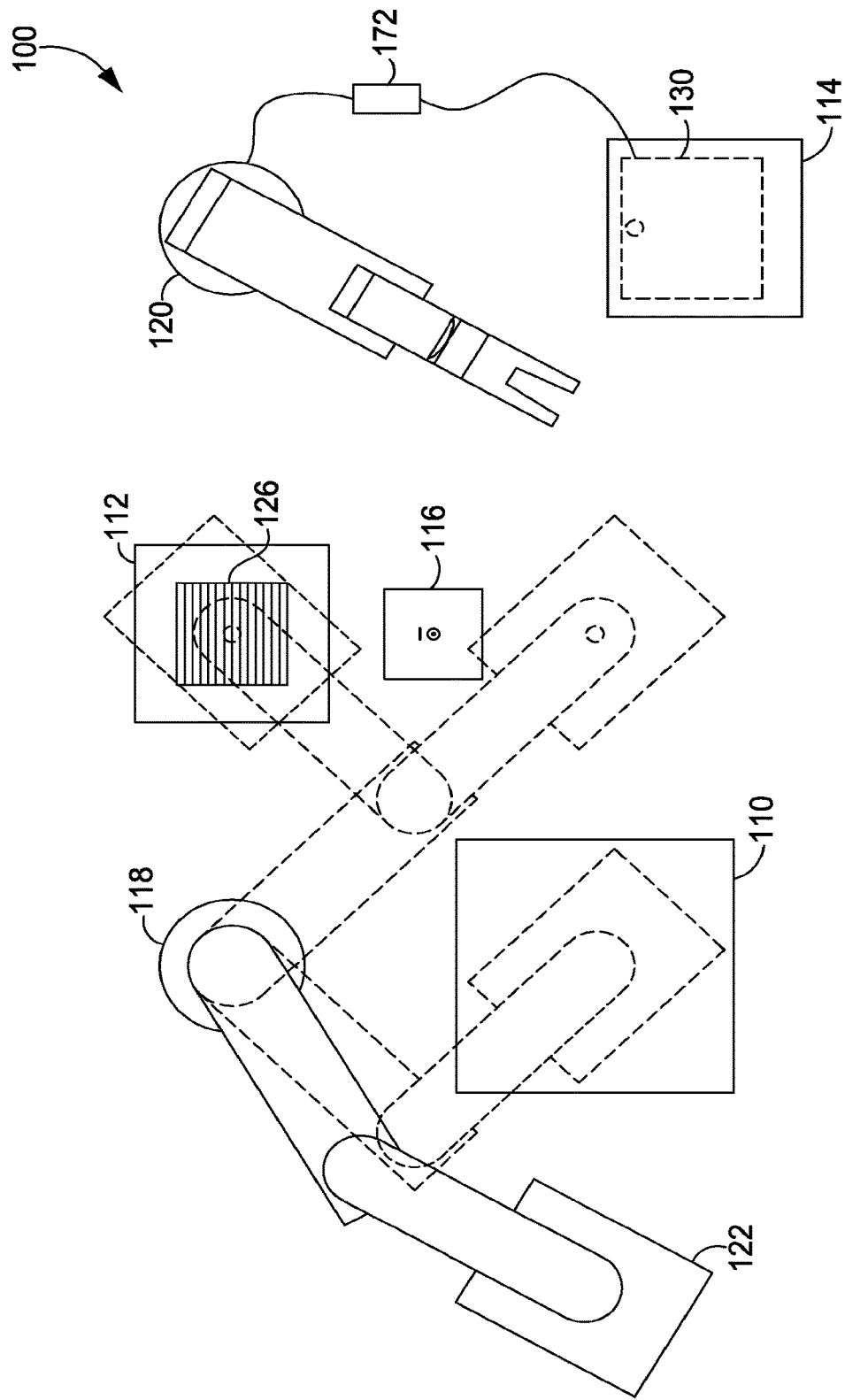
FIGS. 1 and 2 depict schematic diagrams of a top view of an exemplary system for assembling and stitching shoe parts in an automated manner in accordance with aspects of the present invention.
Figure 2:
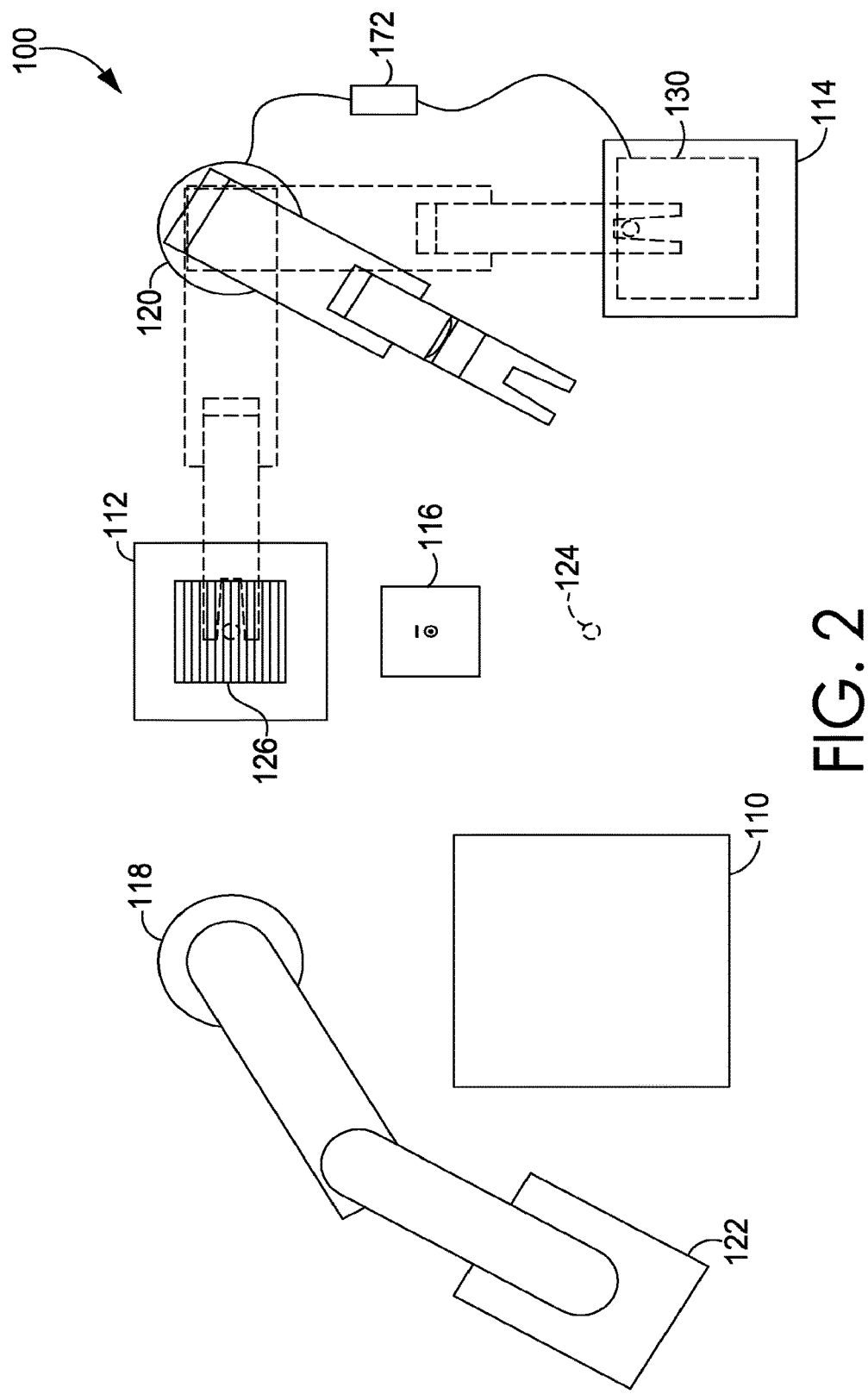

Subject matter described herein relates to automated assembly and stitching of shoe parts, and FIGS. 1 and 2 depict schematic diagrams of an overall exemplary assembly and stitching system 100. For example, FIGS. 1 and 2 illustrate a birds-eye perspective of various exemplary shoe manufacturing stations and an exemplary method of movement, via exemplary conveyance mechanisms, between them. The arrangement of manufacturing stations in the system 100 is exemplary and may be rearranged in various other configurations. By way of example only, the system 100 may be comprised of a circular track (e.g., conveyor system) that has manufacturing arms or spokes (e.g., other conveyor systems) feeding into a central circular track. In another exemplary system, a main track may be arranged in a zigzag pattern that traverses from one station to the next. Again, these described arrangements are merely examples and a variety of other arrangements may be utilized.

The illustrated assembly and stitching system 100 includes first, second and third manufacturing stations 110, 112, 114 (respectively), an adhesive applying station 116, first and second conveyance mechanisms 118 and 120, respectively, and a shared control system 172. As illustrated, the first manufacturing station 110 comprises a shoe part retrieval station from which shoe parts may be retrieved prior to assembly, the second manufacturing station 112 comprises a stacking station for assembly or stacking shoe parts at preset relative positions to form part stacks, and the third manufacturing station 114 comprises a stitching station for stitching together of shoe parts comprising part stacks. This list of shoe-manufacturing stations is merely exemplary and a variety of other stations may also be comprised in the system 100. Moreover, specific stations may be added, subtracted, powered up, or powered down based on a certain style or type of shoe that is being manufactured. For example, although the adhesive applying station 116 may be utilized when processing one type of shoe part (e.g., a non-base shoe part), the adhesive applying station 116 may be powered down or removed when the system 100 is processing a different type of shoe part (e.g., a base or first shoe part), as more fully described below. Additionally, manufacturing steps described herein as being performed at one station may be performed at a manufacturing location or facility that differs from the other stations. Further, one or more stations may be combined such that manufacturing steps associated with individual stations are combined at the combined station(s). Any and all such variations, and any combination thereof, are contemplated to be within the scope hereof.

The illustrated exemplary first and second conveyance mechanisms 118 and 120 comprise robotic arms. However, the illustrated conveyance mechanisms are merely exemplary and any suitable part-moving apparatuses (e.g., conveyor mechanism, motor-driven turntable, X-Y planar movement table, X-Y-Z spatial movement table, etc.) may be utilized within the scope of aspects hereof. The first conveyance mechanism 118 includes a first pick-up tool 122 associated therewith for picking up or retrieving shoe parts, for instance, from the first manufacturing or shoe part retrieval station 110. In the illustrated aspect, the first pick-up tool 122 comprises a vacuum plate including one or more apertures therein through which air flows inwardly to temporarily hold a shoe part being picked-up or retrieved, as more fully described below. In one aspect, the first pick-up tool comprises a part pick-up tool described in U.S. Patent Publication No. 2013/0127193 A1 which is entitled MANUFACTURING VACUUM TOOL, and is incorporated in its entirety herein by reference. It will be understood and appreciated, however, that the first pick-up tool may comprise any suitable pick-up tool including, without limitation, a grasping tool, a scooping tool, an electrostatic-based tool, and the like.

As illustrated by dotted outline, the first conveyance mechanism 118 is configured to retrieve shoe parts from the first manufacturing or shoe retrieval station 110 and temporarily hold the shoe parts as they are moved through a first vision system 124 (see FIG. 2), moved through the adhesive applying station 116, and situated at the second manufacturing or stacking station 112. The second manufacturing station 112 includes a stacking surface 126 associated therewith for situating and/or stacking various shoe parts at least partially atop one another at preset relative positions in preparation for downstream processing, as more fully described below. Merely for ease of explanation, the portion of the exemplary system 100 through which the first conveyance mechanism 118 moves (that is, the portion of the system 100 through which movement of the first conveyance mechanism 118 is illustrated by dotted line in FIG. 1) is referred to herein as the first stage of the system 100.

With reference now to FIG. 2, the second conveyance mechanism 120 includes a second pick-up tool 128 associated therewith. In the illustrated aspect, the second pick-up tool 128 comprises an interchangeable grasping tool. It will be understood and appreciated, however, that the nature of the second pick-up tool is not intended to limit aspects hereof and any suitable pick-up tool including, without limitation, a scooping tool, vacuum tool, etc., may be used. As illustrated by dotted outline, the second conveyance mechanism 120 is configured to retrieve stacked shoe parts from the second manufacturing or stacking station 112 and move the part stacks to the third manufacturing or stitching station 114. In the illustrated aspect, the third manufacturing station 114 comprises a stitching machine 130 associated therewith for stitching together various stacked shoe parts, as more fully described below. Merely for ease of explanation, the portion of the exemplary system 100 through which the second conveyance mechanism 120 moves (that is, the portion of the system 100 through which movement of the second conveyance mechanism 120 is illustrated by dotted line in FIG. 2) is referred to herein as the second stage of the system 100.

With reference now to FIGS. 3-26, schematic diagrams are shown sequentially illustrating the assembly and stitching together of two shoe parts, in accordance with aspects of the present invention. It will be understood that aspects hereof are not limited to the assembly and stitching of only two shoe parts but may be utilized to stitch together any number of shoe parts and/or shoe part assemblies. In one aspect, a plurality of flat pre-cut upper shoe parts may be assembled and stitched together in an automated manner to form semi-finished shoe uppers. It is also contemplated that one or more of the sequential steps illustrated may be omitted, additional steps may be inserted, and one or more steps may be rearranged in a sequential order in accordance with aspects hereof.

FIG. 3 is a schematic diagram of the exemplary system 100 for assembling and stitching shoe parts in an automated manner shown in FIGS. 1 and 2, the system 100 having a first shoe part 132 situated at the first manufacturing or shoe part retrieval station 110. Prior to being situated at the first manufacturing station 110, shoe parts (e.g., the first shoe part 132) may be maintained at a part-loading station (not shown). An exemplary part-loading station may be a motionless surface, such as a table or workbench from which parts are transferred to part-feeding apparatuses. For example, parts may be manually or automatically loaded onto part-feeding apparatuses. In addition, an exemplary part-loading station may be comprised of a conveyor belt or other automated apparatus for moving parts. For example, the part-loading station may move shoe parts onto a part-feeding apparatuses in an automated manner. An exemplary system comprising part-loading stations and part-feeding apparatuses is illustrated and described in U.S. Patent Publication No. 2013/0125319 A1 which is entitled AUTOMATED MANUFACTURING OF SHOE PARTS, and is incorporated herein by reference in its entirety.

Shoe parts (e.g., the first shoe part 132) may be cut or otherwise prepared to be incorporated or assembled into another shoe part. For example, in one aspect, shoe parts may have been automatically cut from a stock material using an automatic-cutting tool (not shown). An exemplary automatic-cutting tool may comprise a sharp edge that is shaped to match an outline of a shoe part and that is pressed into a stock material. When an automatic-cutting tool is used, the system 100 may derive a part identity, part location, a part rotation, and/or a part size from the automatic-cutting tool. For example, an automatic-cutting tool may record a size and shape of the cutting pattern used to create the shoe part and communicate the recorded information to the system 100, thereby apprising the system 100 of the identity and/or size of the cut shoe part. Moreover, an automatic-cutting tool may record a location at which a cutting step was executed, as well as a rotation of a cutting instrument when the cutting step was executed, and communicate this recorded information to the system 100, thereby informing the system 100 of the orientation (e.g., coordinate position and rotation) of the cut shoe part within the system. In an exemplary aspect, this part-identity information and part-orientation information, which may be derived from a cutting tool, may be used, at least in part, to determine a position at which the system 100 places a part and attaches a part.

Shoe parts, such as the first shoe part 132, may be comprised of a single part or of a plurality of assembled parts. For example, shoes parts may be comprised of one or more layers of material, such as leather, polymers, textiles, rubber, foam, mesh, TPU and/or the like. Moreover, the shoe parts may have a variety of characteristics or combinations of characteristics, such as rigid, malleable, porous, non-porous, etc. Additionally, shoe parts may be comprised of a pre-laminated composition (e.g., hot melt) that helps to facilitate adherence of one part to another part prior to stitching. In one exemplary aspect, the shoe parts represent different pieces of a shoe upper that are to be assembled prior to molding the shoe upper for attachment to other shoe parts. The shapes and combinations depicted by the shoe parts herein are merely exemplary.

Figure 5:
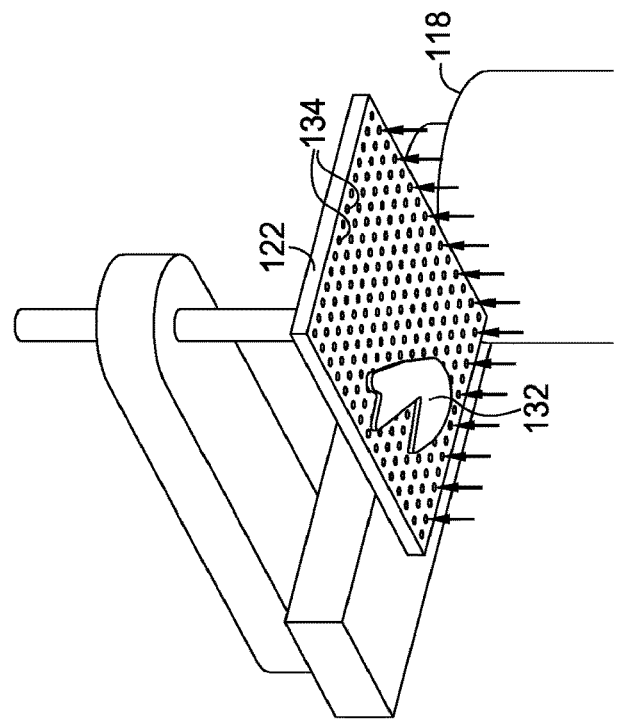
Figure 4:
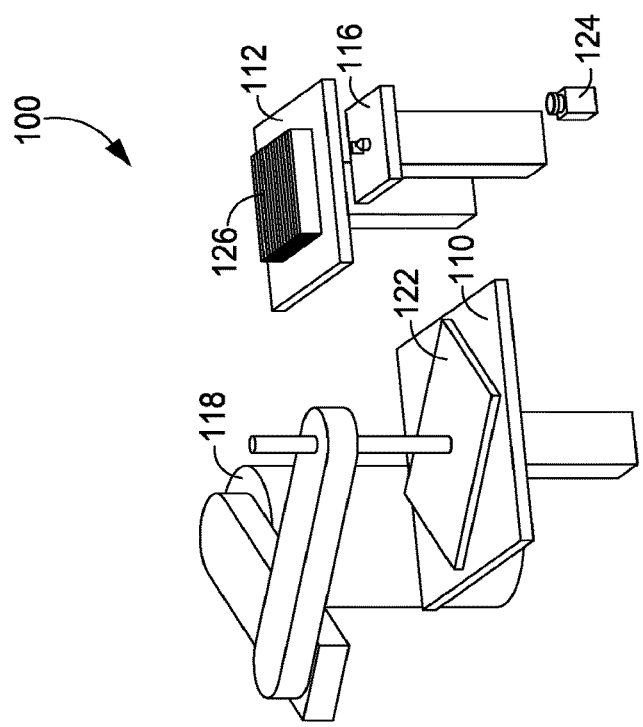

With reference to FIG. 4, the first stage of the exemplary system of FIG. 3 is illustrated and the first pick-up tool 122 associated with the first conveyance mechanism 118 is shown retrieving the first shoe part shown in FIG. 3 (covered by the first pick-up tool 122 and thus not visible in the view of FIG. 4) from the first manufacturing or shoe part retrieval station 110. As shown in FIG. 5, the illustrated system 100 includes a vacuum plate as an exemplary first pick-up tool 122, the vacuum plate including one or more apertures 134 therein through which air flows inwardly in the direction of the arrows to temporarily hold the first shoe part 132 upon retrieval. In one aspect, the first pick-up tool 122 comprises a part pick-up tool described in U.S. patent application Ser. No. 13/299,934 which is entitled MANUFACTURING VACUUM TOOL, and is incorporated in its entirety herein by reference. It will be understood and appreciated, however, that the first pick-up tool may comprise any suitable pick-up tool including, without limitation, a grasping tool, a scooping tool, an electrostatic-based tool, and the like.

Figure 6:
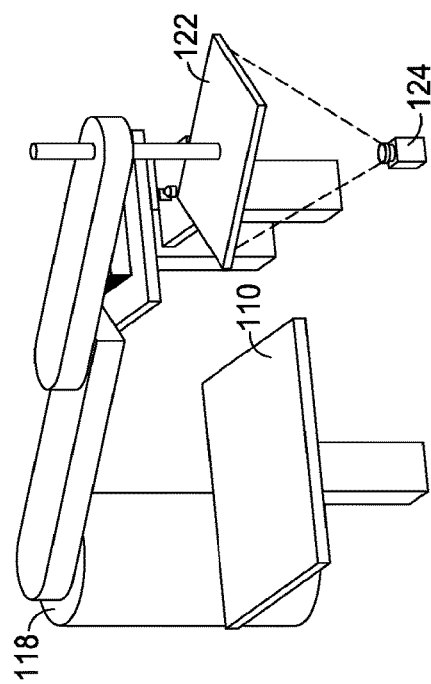

Once retrieved by the first pick-up tool 122, the first conveyance mechanism 118 moves the retrieved shoe part (covered by the first pick-up tool and thus not visible in the view of FIG. 6) to a first vision system 124 where a position of the first shoe part relative to the first pick-up tool 122 is determined. In one aspect, the position of the first shoe part 132 relative to the first pick-up tool 122 may include information about the position of the first shoe part 132 as well as, for instance, a position and/or an orientation of the first shoe part 132. Such position and orientation information may be particularly helpful when the first shoe part 132 has an irregular shape as illustrated. In aspects, the first vision system 124 includes an image-capturing device (e.g., camera, video recorder, charge-coupled device, etc.) that is configured to capture one or more images of the first shoe part 132 and its location (including orientation and/or position) relative to the first pick-up tool 122. In aspects, the first vision system 124 may also include a computer system (not shown) having vision software functionality, the computing system being coupled with the image-capturing device for utilizing the captured images and information, as well as, in an exemplary aspect, part-identity and/or part-orientation information that may be derived from a cutting tool and provided to the system 100 as set forth above, to derive assembly and stitching information for downstream processing.

Figure 7:
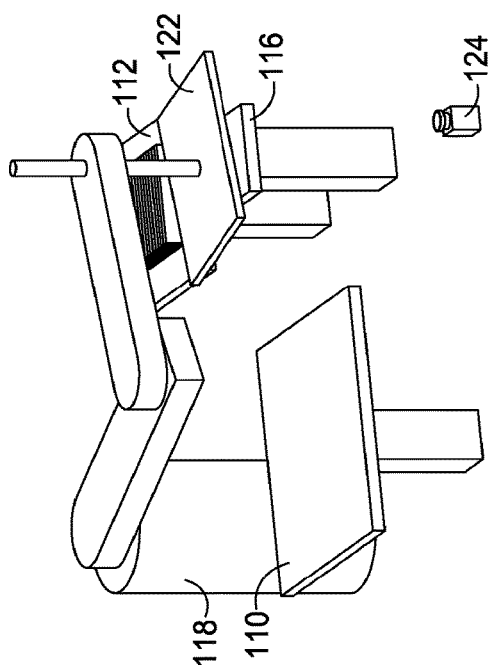
Figure 8:
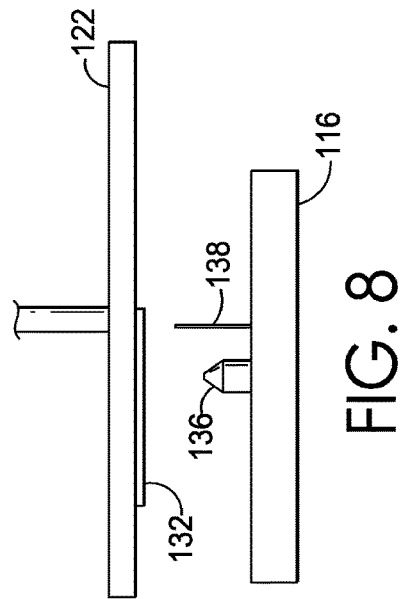

With reference now to FIG. 7, the first conveyance mechanism 118 continues movement of the first shoe part (covered by the first pick-up tool and thus not visible in the view of FIG. 7) via the first pick-up tool 122 to the adhesive applying station 116. As better seen in the view of FIG. 8, the adhesive applying station 116 includes an adhesive dispensing mechanism 136, e.g., a nozzle, configured for dispensing an adhesive onto a shoe part 132 being held by the first pick-up tool 122. The adhesive applying station 116 further includes an adhesive spreading mechanism configured for spreading the applied adhesive over at least part of the surface of the appropriate shoe part and more evenly distribute the adhesive with a substantially uniform thickness. Such adhesive spreading improves adhesion of multiple shoe parts to one another upon contact.

Generally speaking, there are two exemplary types of shoe parts that will utilize the system 100 of FIGS. 3-26—base shoe parts (i.e., those shoe parts or part assemblies that will be placed directly on a stacking surface for assembly rather than at least partially atop another shoe part) and non-base shoe parts (i.e., those shoe parts or part assemblies that will be placed at the stacking surface 126 such that at least a portion thereof overlaps at least a portion of a base shoe part or part assembly already present at the stacking surface 126). While the present example is limited to two parts, it is contemplated that any number of parts in any combination may utilize aspects of the present invention. In the example illustrated in FIGS. 3-26, the first shoe part 132 comprises a base shoe part. Accordingly, in the aspect shown, no adhesive is applied to the first shoe part 132 as it is a base shoe part and not itself being adhered to another shoe part at the illustrated stage of processing. As such, the adhesive applying station 116 is powered down or otherwise not activated as the first conveyance mechanism 118 moves the first pick-up tool 122 with the first shoe part 132 through the adhesive applying station 116 without applying adhesive.

Figure 10:
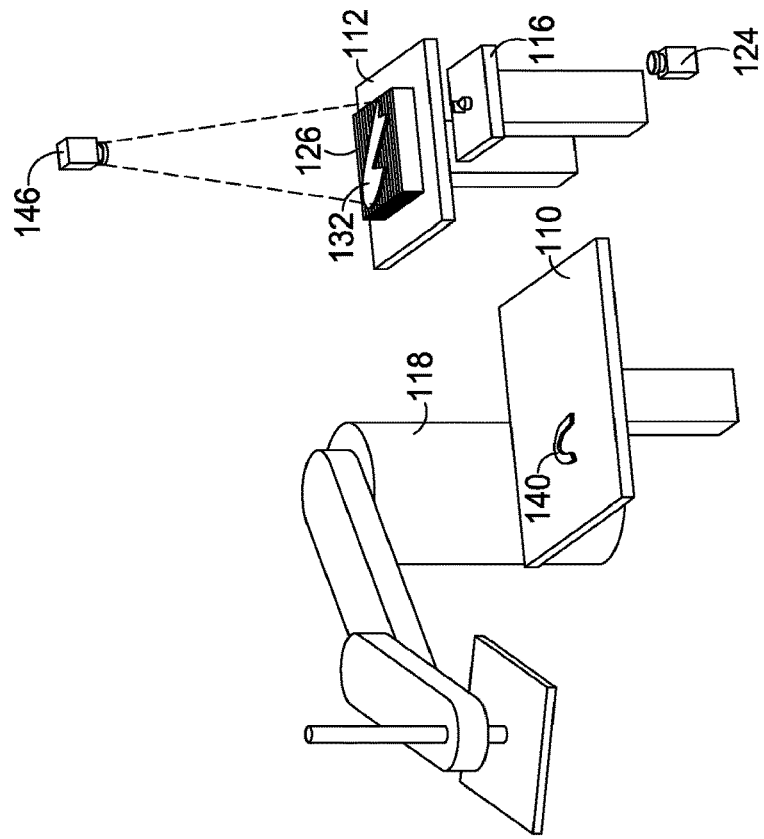
Figure 9:
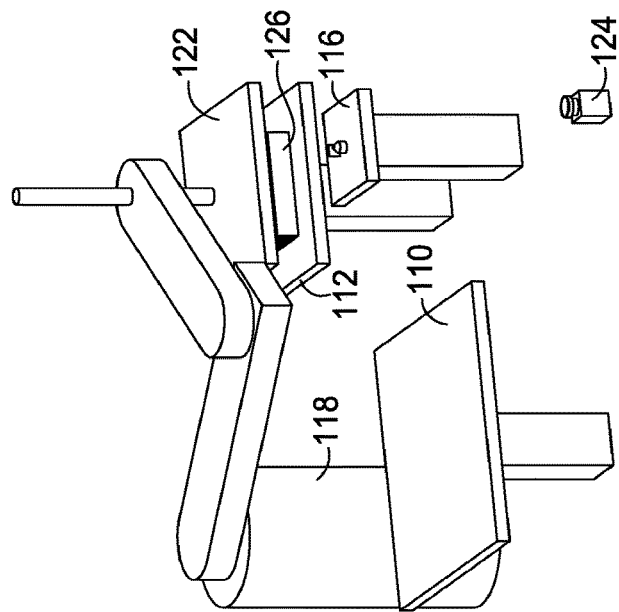

Referring now to FIG. 9, the first conveyance mechanism 118 continues movement of the first pick-up tool 122, and accordingly the first shoe part 132, to the second manufacturing or stacking station 112 where the first shoe part 132 is situated atop the stacking surface 126. The position and orientation of placement may be determined, in part, based upon the position of the first shoe part 132 relative to the first pick-up tool 122 determined by the first vision system 124 and/or any part-identity and/or part-orientation information that may be derived, for instance, from a cutting tool, or otherwise provided to the system 100. As illustrated in FIG. 10, upon release of the first shoe part 132 from the first pick-up tool 122 onto the stacking surface 126, the second vision system 146 examines the first shoe part 132 at the stacking surface 126 and determines a position of the first shoe part 132 relative to the stacking surface 126. Additionally, the first conveyance mechanism 118 returns to the first manufacturing or part retrieval station 110 where a second shoe part 140 is situated for retrieval.

Figure 12:
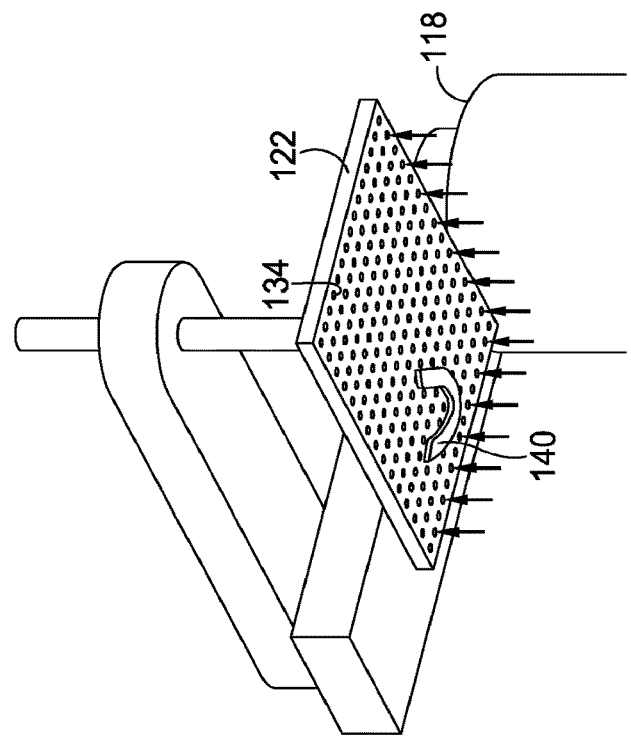
Figure 11:
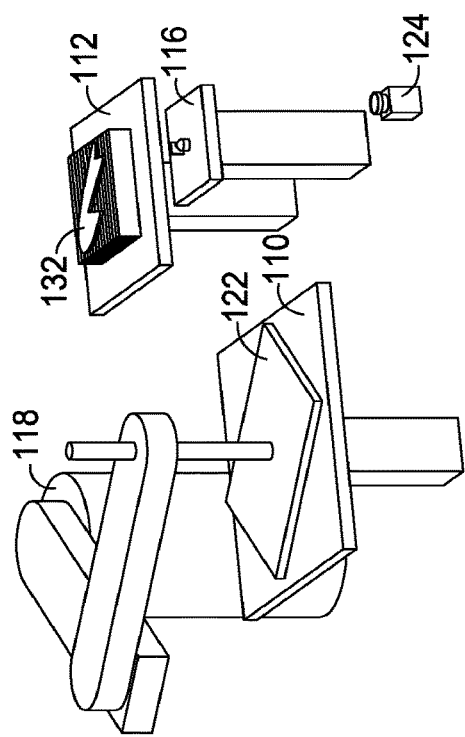

As illustrated in FIG. 11, the first pick-up tool 122 associated with the first conveyance mechanism 118 retrieves the second shoe part (covered by the first pick-up tool and thus not visible in the view of FIG. 11) from the first manufacturing or part retrieval station 110. As shown in FIG. 12, the illustrated first pick-up tool comprises a vacuum plate as an exemplary first pick-up tool 122 as previously described with reference to FIG. 5. The first pick-up tool 122 includes a plurality of apertures 134 therein through which air flows inwardly in the direction of the arrows temporarily holding the second shoe part 140 upon retrieval.

Figure 13:
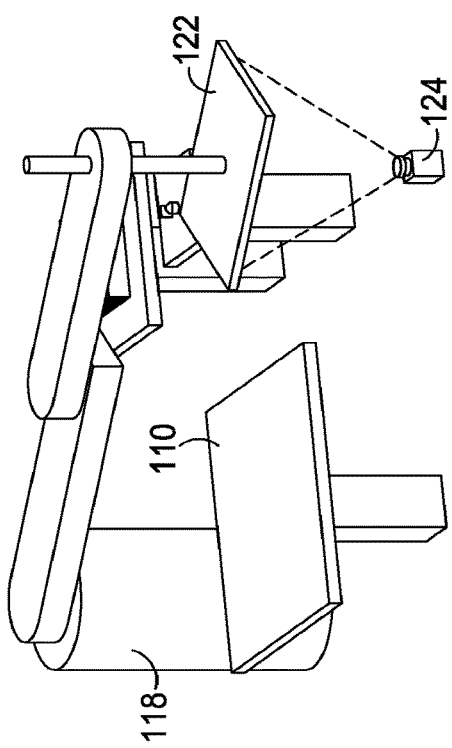

Once retrieved by the first pick-up tool 122, the first conveyance mechanism 118 moves the retrieved second shoe part (covered by the first pick-up tool 122 and thus not visible in the view of FIG. 13) to the first vision system 124 where the position of the second shoe part relative to the first pick-up tool 122 is determined. As previously set forth with reference to FIG. 6, in one aspect, the position of the second shoe part 140 relative to the first pick-up tool 122 may include information about the position of the second shoe part 140 as well as, for instance, a position and/or an orientation of the second shoe part 140. Such position and orientation information may be particularly helpful when the second shoe part 140 has an irregular shape as illustrated.

Figure 14:
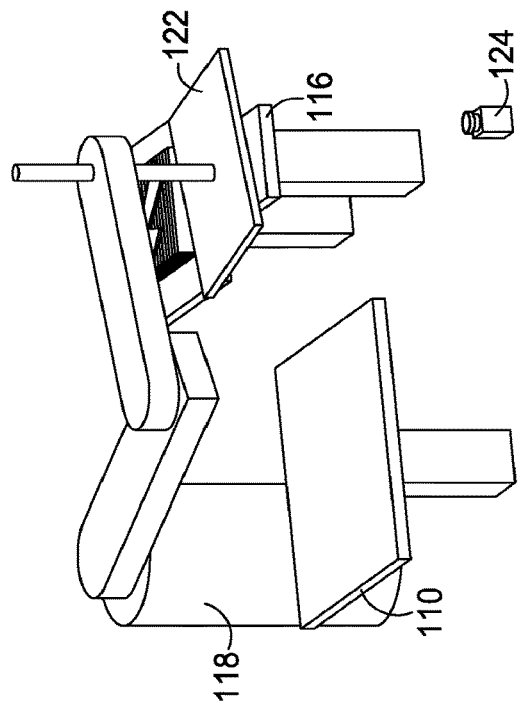

With reference to FIG. 14, the first conveyance mechanism 118 continues movement of the second shoe part (covered by the first pick-up tool 122 and thus not visible in the view of FIG. 14) via the first pick-up tool 122 to the adhesive applying station 116. As previously described with reference to FIG. 8, there are two basic types of shoe parts that will utilize the system 100 of FIGS. 3-26—base shoe parts (i.e., those shoe parts or part assemblies that will be placed directly on a stacking surface 126 for assembly rather than at least partially overlapping another shoe part) and non-base shoe parts (i.e., those shoe parts or part assemblies that will be placed at the stacking surface 126 such that at least a portion thereof overlaps at least a portion of a base shoe part or part assembly already present at the stacking surface 126). As in the example illustrated in FIGS. 3-26, the first shoe part 132 is already situated on the stacking surface 126, the second shoe part 140 is a non-base shoe part. Accordingly, adhesive is applied to the second shoe part 132 at the adhesive applying station 116 to at least temporarily aid in adhesion of the second shoe part atop at least a portion of the first or base shoe part 132.

Figure 16A:
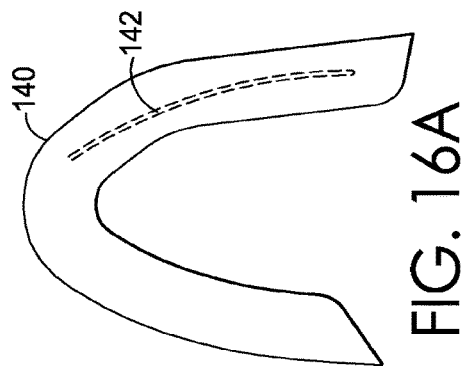
FIG. 16A is a schematic diagram illustrating application of an adhesive in accordance with FIGS. 15A and 15B, prior to (or in the absence of) contact with the spreading mechanism, in accordance with aspects of the present invention.
Figure 16B:
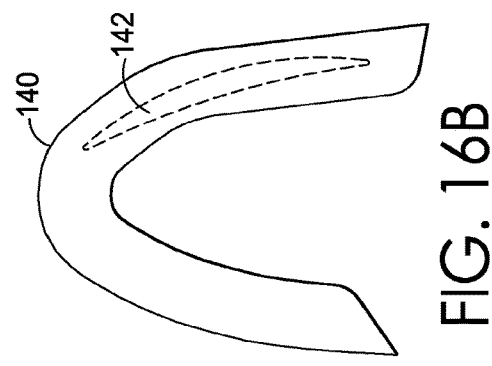
FIG. 16B is a schematic diagram illustrating application of an adhesive in accordance with FIGS. 15A and 15B, subsequent to contact with the spreading mechanism, in accordance with aspects of the present invention.
Figure 15A:
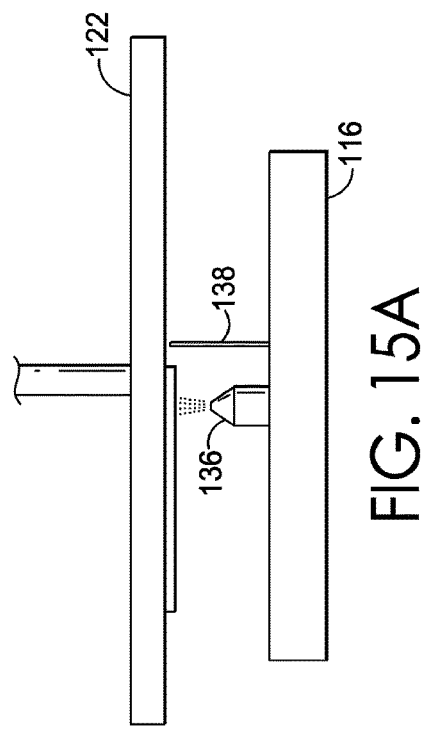
FIG. 15A is a schematic diagram of a side view of the exemplary adhesive applying station of FIG. 14, depicting that as the shoe part being processed by the system of FIGS. 10-17 is a second or non-base shoe part, adhesive is applied thereto, in accordance with aspects of the present invention.
Figure 15B:
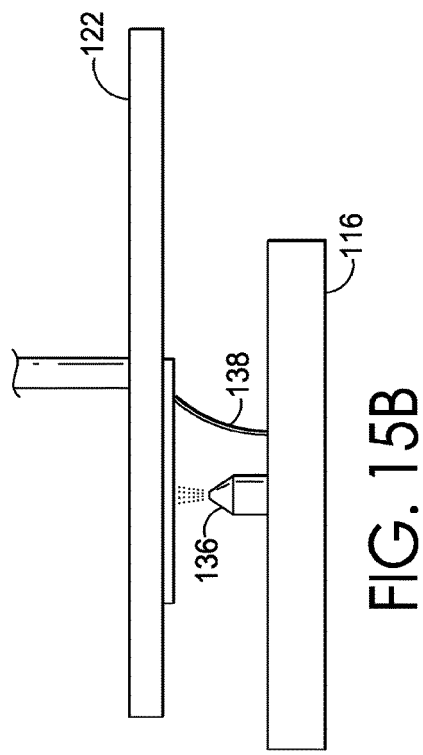
FIG. 15B is a schematic diagram of a side view of the exemplary adhesive applying station of FIGS. 14 and 15A, depicting that the adhesive applying station includes a spreading mechanism for spreading applied adhesive over at least a portion of a surface of the second shoe part, in accordance with aspects of the present invention.

In one aspect, and as better seen in the view of FIGS. 15A and 15B, the adhesive applying station may include an adhesive dispensing mechanism 136, e.g., a spray nozzle, which dispenses an adhesive onto a surface of the second shoe part 140. The first conveyance mechanism 118 moves the first pick-up tool 122, and thus the second shoe part 140, in a direction relative to the adhesive applying station 116 such that the adhesive is dispensed over at least a portion of the surface of the second shoe part 140. Subsequent to the application of the adhesive, the surface of the second shoe part 140 over which adhesive was applied is contacted by the adhesive spreading mechanism 138 (see FIG. 15B). As the adhesive spreading mechanism 138 contacts the portion of the second shoe part 140 surface, the adhesive is spread out such that is more evenly distributed over at least a portion of the surface with a substantially uniform thickness. FIGS. 16A and 16B illustrate an exemplary distribution of adhesive (shown in dashed outline) without utilization of the adhesive spreading mechanism 138 (FIG. 16A) and with utilization of the adhesive spreading mechanism 138 (FIG. 16B). As previously set forth, such adhesive spreading improves adhesion of the two shoe parts to one another upon contact.

As previously described, in aspects, shoe parts may comprise a pre-laminated composition (e.g., hot melt) that helps to facilitate adherence of one shoe part to another. In such instances, it should be noted, the adhesive applying station 116 may be powered down or otherwise absent from the system 100 as application of adhesive as described would be unnecessary.

Figure 18:
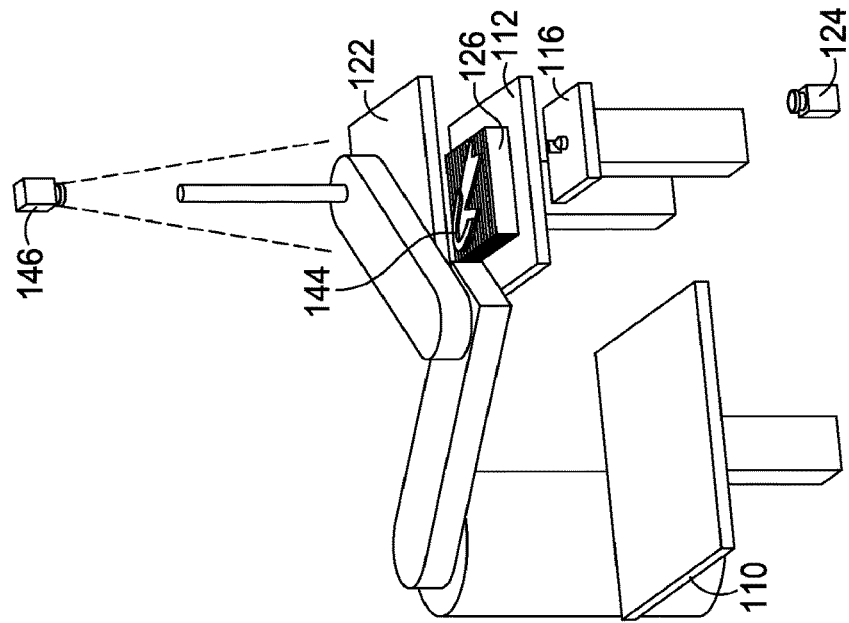
Figure 17:
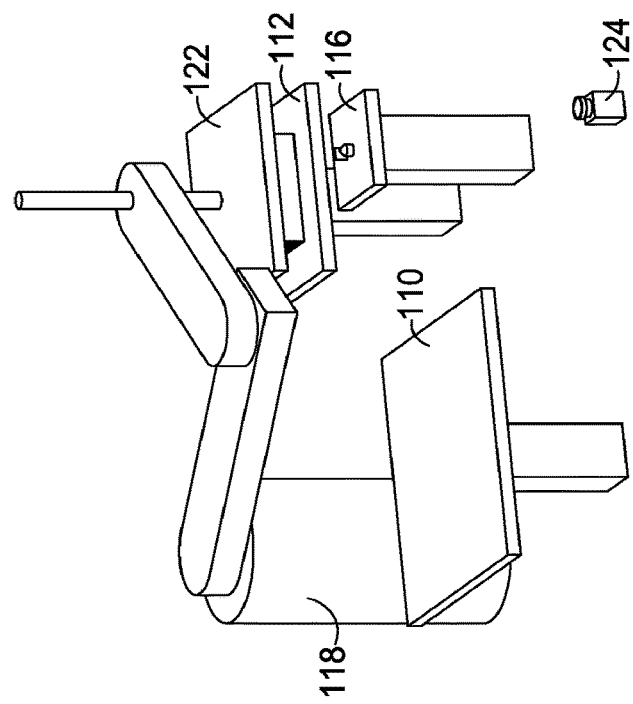

Referring now to FIG. 17, the first conveyance mechanism 118 continues movement of the first pick-up tool 122 and, accordingly, the second shoe part 140, to the second manufacturing or stacking station 112 where the second shoe part 140 is situated at the stacking surface 126 such that it overlaps at least a portion of the first shoe part 132 at a preset relative position. The first and second shoe parts assembled such that the second shoe part 140 at least partially overlaps at least a portion of the first shoe part 132 forms a part stack or assembly 144 at the stacking surface 126, as shown in FIG. 18. The position and orientation of placement of the second shoe part 140 atop at least a portion of the first shoe part 132 may be determined, in part, based upon the position of the second shoe part relative to the first pick-up tool 122 determined by the first vision system 124, the first shoe part 132 relative to the stacking surface 126 determined by the second vision system 146 and/or any part-identity and/or part-orientation information that may be derived, for instance, from a cutting tool, or otherwise provided to the system 100. Upon release of the second shoe part 140 from the first pick-up tool 122 onto the stacking surface 126 at the pre-set position relative to the first shoe part 132, the first conveyance mechanism 118 returns to the first manufacturing station 110 where another shoe part (not shown) may be situated for retrieval, or to a powered down or default position to await receipt of further instruction.

Referring now to FIG. 19, a schematic diagram of the second stage of the exemplary system 100 of FIG. 3 depicting examination by the second vision system 146 of the part stack 144 at the stacking surface 126 is illustrated. The second vision system 146 examines the part stack 144 at the stacking surface 126 to determine a position of the part stack 144 relative to the stacking surface 126. Introduced in FIGS. 19 and 20 for exemplary purposes are optional light-emitting devices 145. The light-emitting devices 145 are depicted as being configured to illuminate at least a portion of the stacking surface 126, in an exemplary aspect. The light-emitting device 145 may be any lighting source providing any wavelength of light at any intensity, such as incandescent lights, light emitting diodes, and/or fluorescent lights providing illumination in the visible spectrum, infrared spectrum, and/or ultraviolet spectrum, for example. Any number or configuration of light-emitting device may be implemented in various aspects provided herein. The light-emitting device 145 may, in an exemplary aspect, enhance the ability of the second vision system 146 to identify features, lines, intersections, joints, contours, dimensions, position, and the like of one or more components, such as the part stack 144. This enhancement provided by the light-emitting device 145 may be beneficial for lower contrast detections, faster visual detection by electronic sensing means, and/or greater confidence in feature/edge detection, for example. A larger view of this portion of the system 100 is illustrated in FIG. 20.

In one aspect, the position of the part stack 144 relative to the stacking surface 126 may include information about the location of the part stack 144 as well as, for instance, a position and/or an orientation of the part stack 144. Such position and orientation information may be particularly helpful when the part stack has an irregular shape like the part stack 144 illustrated in FIGS. 19 and 20. In aspects, the second vision system 146, like the first vision system 124, includes an image-capturing device (e.g., camera, video recorder, charge-coupled device, etc.) that is configured to capture one or more images. The second vision system 146 may be configured to capture images of the part stack 144 and its location (including orientation and/or position) relative to the stacking surface 126. In aspects, the second vision system 146 may also include a computer system (not shown) coupled with the image-capturing device for utilizing the captured images to derive retrieval and stitching information for downstream processing.

Further, in addition to leveraging the second vision system 146 for determining a position of the part stack 144 relative to one or more components, it is contemplated that the second vision system 146 may be functional for virtually positioning and adjusting a preset stitching pattern on one or more portions of the part stack 144, which may be used by a stitching apparatus subsequently. As will be discussed in greater detail at FIGS. 27-28, a preset stitching pattern may be based upon the nature of the shoe parts comprising the part stack 144 being stitched (that is, known information regarding the type of shoe part assembly being processed, the design of the shoe part assembly being processed, the materials comprising the shoe parts being stitched together, and the like). At times, however, for instance when there is a defect in one of the shoe parts comprising a part stack or when there has been some amount of slippage during positioning of the shoe parts and/or the part stack during assembly and prior to stitching, adjustments to the preset stitching pattern may be desired. It is this positioning and adjusting of the stitching pattern that may utilize the second visions system 146 to perform these various functions.

In an exemplary aspect, it is contemplated that the second visions system alone or in combination with a computing system is configured for capturing a representation of the part stack. The second visions system and/or computing system may then associate a preset stitching pattern with the captured representation of the part stack. For example, a stitching pattern that is maintained in memory having a desired pattern for an optimal part stack may be virtually (e.g., digitally) overlaid (e.g., projected) on the captured representation of the part stack allowing the computing system and/or vision system to determine that the preset stitching pattern would result in an offset of at least one stitch through the part stack relative to an edge of a portion of one of the shoe parts that overlaps a portion of another shoe part that is outside of a desired deviation range. Stated differently, if the preset stitching pattern deviates from a desired relative location on the part stack (e.g., proximity to an edge or an overlapping location), the preset stitching pattern is determined to need to be altered. As a result, it is contemplated that the computing system and/or the second vision system then generates an adjusted stitching pattern that maintains the offset of the stitches within the desired deviation range. This adjusted stitching pattern may then be associated with and maintained in memory for the particular part stack and a subsequent stitching operation. For example, the adjusted stitch path may define one or more motions to be performed by a conveyance mechanism and/or a sewing machine to perform a stitch on the part stack in accordance with the adjusted stitching path.

In an exemplary aspect, a stitching pattern that is virtually positioned on and adjusted to the part stack 144 is maintained in memory of a computing system (e.g., PLC) such that when the part stack 144 is positioned at a stitching apparatus, a conveyance mechanism moves the part stack 144 in an appropriate motion that cause stitching of the part stack 144 at locations determined with the aid of the second vision system 146, in an exemplary aspect. This functionality is further discussed hereinafter in an alternative/additional aspect utilizing a third vision system 170. As can be appreciated any combination or individual vision system may be used to determine a stitching pattern.

Figure 21A:
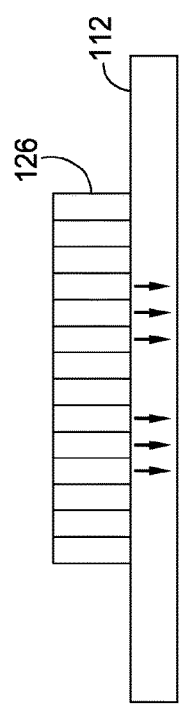
FIG. 21A is a schematic diagram of a side view of the exemplary second manufacturing or stacking station illustrating that the stacking surface includes a plurality of members that are independently adjustable, all members being in the "up" position in the illustrated view creating a substantially planar top surface, in accordance with aspects of the present invention.
Figure 21B:
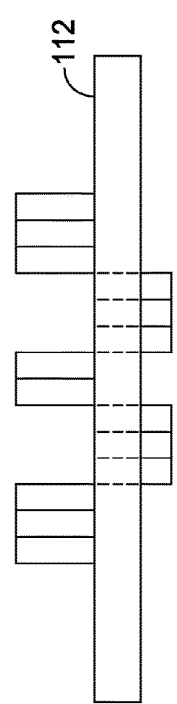
FIG. 21B is a schematic diagram of a side view of the exemplary second manufacturing or stacking station of FIG. 21A with various adjustable members of the stacking surface remaining in the "up" position and others being moved to the "down" position, in accordance with aspects of the present invention.

The stacking surface 126 of the exemplary system 100 of FIGS. 3-26 may be substantially in a plane parallel to a support surface of the third manufacturing station 112. As illustrated, the stacking surface 126 includes a plurality of adjustable members 148, each of the members being independently adjustable in at least one direction relative to the plane via hydraulics, electromagnetics, pneumatics, or the like. In one aspect, the plurality of adjustable members may be aligned substantially parallel to one another such that respective longitudinal axes thereof are perpendicular to the plane of the stacking surface 126 and each member 148 may be independently adjustable in at least a direction perpendicular to the plane of the stacking surface 126. In other aspects, one or more of the plurality of members 148 may be adjustable in a direction parallel to the plane of the stacking surface 126 (for instance, slidably adjustable in a forward/backward or side-to-side direction) or in any other suitable direction. While the sequential process depiction in FIGS. 3-26 primarily shows row or column configurations for the independently adjustable members 148, it is contemplated that any relative relationship of independently actionable members may be utilized. For instance, the plurality of members 148 may be arranged in a grid-like orientation having a plurality of rows and a plurality of columns forming a matrix of independently adjustable members 148 as shown in FIG. 21D. Any and all such variations, and any combination thereof, are contemplated to be within the scope of aspects hereof.

In aspects, each adjustable member 148 comprising the stacking surface 126 has an extended position and a retracted position. When all members 148 are in their respective extended positions, a substantially planar top surface is formed on the stacking surface 126. When one or more of the members 148 is in their respective retracted positions, one or more openings may be created that are configured for receiving one or more tools used in the downstream automated manufacture of shoe parts, as more fully described below.

In aspects, the second vision system 146 is configured to utilize the determined position information of the part stack 144 relative to the stacking surface 126 (and, if applicable, any additional information provided to the system 100 regarding the shoe parts being assembled) to generate instructions for some of the plurality of members 148 to adjust (e.g., utilizing hydraulics, pneumatics, electromagnetics, or the like) to accommodate retrieval of the part stack 144 from the stacking surface 126. In one aspect, the plurality of adjustable members may be aligned substantially parallel to one another such that respective longitudinal axes thereof are perpendicular to the plane of the stacking surface 126 and each member 148 may be independently adjustable in at least a direction perpendicular to the plane of the stacking surface 126. Such an aspect is illustrated in FIGS. 21A and 21B. FIG. 21A illustrates all members 148 being in an "up" or extended position as they were upon stacking of the first and second shoe parts 132 and 140 to form the part stack 144 (see FIG. 20). FIG. 21B illustrates various adjustable members 148 remaining in the "up" or extended position and others being moved to a "down" or retracted position subsequent to receipt of instructions from the second vision system 146 and based upon the determined position of the part stack 144 relative to the stacking surface 126 (and any other information received by the system 100, as applicable). FIG. 22 illustrates examination by the second vision system 146 of the part stack relative to the stacking table 126, similar to FIG. 20, but after various adjustable members 148 thereof have been moved to a "down" or retracted position in accordance with the aspect illustrated FIG. 21B. Stated differently, the adjustable members 148 are selectively retracted to form an opening into which a pick-up tool portion may be inserted without disturbing the part stack 144 prior to securing the part stack 144 with the pick-up tool portion. The adjustable members 148 may be selectively adjusted based on the identified position of a part stack and the known or identified pick-up tool configuration, such that different adjustable members 148 may be retracted for similar part stacks because of a change in position of a part stack relative to the stacking surface 126 or a difference in the pick-up tool configuration.

Figure 21C:
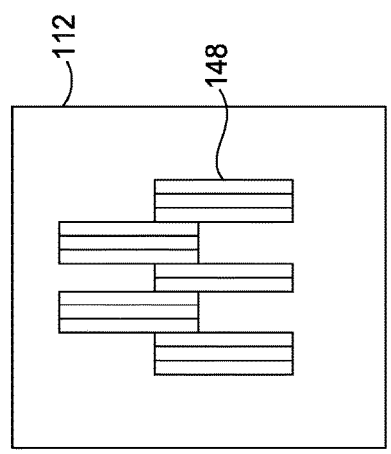
FIG. 21C is a schematic diagram of a top view of the exemplary second manufacturing or stacking station similar to that of FIG. 21A with various adjustable members of the stacking surface slidably adjustable in a forward/backward direction, in accordance with aspects of the present invention.
Figure 21D:
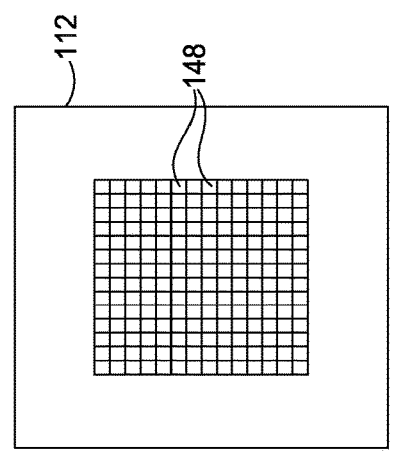
FIG. 21D is a schematic diagram of a top view of the exemplary second manufacturing or stacking station similar to that of FIG. 21A with various adjustable members of the stacking surface arranged in a grid-like orientation having a plurality of rows and a plurality of columns forming a matrix of independently adjustable members, in accordance with aspects of the present invention.

In another aspect, one or more of the plurality of members 148 may be adjustable in a direction parallel to the plane of the stacking surface 126, for instance, slidably adjustable in a forward/backward direction as shown in FIG. 21C, upon receipt of instructions from the second vision system 146 and based upon, at least, the determined position of the part stack 144 relative to the stacking surface 126.

FIG. 23 is a schematic diagram depicting the second pick-up tool 128 associated with the second conveyance mechanism 120 retrieving the part stack 144 from the stacking surface 126 utilizing the openings 150 in the stacking surface 126 created by the member 148 adjustments. As illustrated, the second pick-up tool 128 comprises a gripping tool having two prongs 152 spaced apart from one another by a fixed distance. The adjustable members 148 of the stacking surface 126 have been adjusted such that the prongs 152 fit between the adjustable members for retrieving the part stack 144 from the stacking surface 126. While the prongs 152 of the exemplary gripping tool comprising the second pick-up tool 128 are a fixed distance apart from one another, the pick-up tool 128 itself is interchangeable and may be released and replaced by a pick-up tool better suited for retrieving a given part stack and transferring such part stack to the third manufacturing station 112 for additional processing.

With reference to FIGS. 26A and 26B, two different second pick-up tools 128A and 128B, respectively, are illustrated as coupled with the second conveyance mechanism 120. The second pick-up tool 128 may be interchanged based upon information concerning the shoe part assembly being processed and/or based upon information derived from the second vision system 146, for instance, the location of appropriate openings in the stacking surface 126 that may be utilized for part stack 144 retrieval, information concerning the position of the part stack 144 with respect to the stacking surface 126, and the like. Any and all such variations, and any combination thereof, are contemplated to be within the scope of aspects hereof. In one aspect, the second pick-up tool 128 may be changed automatically and without human intervention. Further, it is contemplated that the second pick-up tool 128 may be dynamically adjustable such that a width between prongs may be adjusted based on the part stack 144 to be manipulated. The part-stack-contacting surface of different pick-up tools may incorporate various materials that provide a desired gripping force while limiting damage to one or more surfaces of the part stack 144. For example, it is contemplated that a first part-stack-contacting surface may be formed with polyurethane, ethylene vinyl acetate, rubber, silicone, sand paper, and other appropriate materials. It is further contemplated that a top part-stack-contacting surface may use a different material than a bottom-part-stack-contacting surface of the pick-up tool. For example, the aesthetic sensitivity of a top surface for a part stack may necessitate a less marring material than a bottom surface of the part stack, in an exemplary aspect.

With reference back to FIG. 23, once the second pick-up tool 128 has retrieved the part stack 144 from the stacking surface 126, the second vision system 146 examines the part stack 144 in the grip of the second pick-up tool 128 to determine a position of the part stack 144 relative to the second pick-up tool 128. In this way, any slippage or other movement caused by the retrieval of the part stack 144 from the stacking surface 126 may be determined and taken into account prior to initiation of downstream processing, as more fully described below.

Subsequent to retrieval of the part stack 144 from the stacking surface 126 by the second pick-up tool 128, the second conveyance mechanism 120 may transfer the part stack 144 (via the second pick-up tool 128) to the third manufacturing station 112 for stitching together of the first and second shoe parts 132, 140 comprising the part stack 144 at the stitching machine 130, as illustrated in FIG. 24. In one aspect, the second conveyance mechanism 120 positions the part stack 144 in position for stitching with respect to the stitching machine 130, that is, positions the part stack 144 such that a location on the part stack 144 at which stitching is to be initiated (the first stitch position) is situated beneath a needle 154 associated with the stitching machine 130. Stitching of the first and second shoe parts 132, 140 comprising the part stack 144 may then be initiated.

As depicted in the schematic diagram of FIG. 25, the part stack 144 may be placed in position with respect to the needle 154 of the stitching machine 130 such that the part stack 144 is in position for stitching. Movement of the part stack 144 relative to the stitching machine 130 is controlled by the second pick-up tool 128 of the second conveyance mechanism 120, which is itself controlled by a shared control system 172 that synchronizes movement of the second conveyance mechanism 120 (and thus the second pick-up tool 128) and the movement of the needle 154 of the stitching machine 130. In this way, when the needle 154 is engaged with the part stack 144 (that is when the needle 154 is in the "down" position), the second conveyance mechanism 120 does not move the part stack 144 and when the needle is disengaged from the part stack 144 (that is, when the needle 154 is in the "up" position), the second conveyance mechanism 120 moves the part stack 144 relative to the needle 154 in accordance with either a preset or adjusted stitching path, as more fully described below. The position of the needle may be determined by a sensor, such as a photoelectric sensor, operatively coupled with the shared control system 172. In one aspect, the part stack 144 is moved along an appropriate stitching path each time the needle 154 is disengaged from the part stack 144.

The third manufacturing station 114 includes a third vision system 170 associated therewith. Like the first and second vision systems 124, 146, the third vision system 170 includes an image-capturing device (e.g., camera, video recorder, charge-coupled device, etc.). The image-capturing device of the third vision system 170 may be configured to capture one or more images of the part stack 144 and its location (including orientation and/or position) relative to the stitching machine 130. In aspects, the third vision system 170 may also include a computer system (not shown) coupled with the image-capturing device for utilizing the captured images to derive information for downstream processing. As illustrated, the third vision system 170 further includes a light-emitting device 174 (e.g., LED, fluorescent light bulb, full spectrum light bulb, color-specific light bulb, etc.) to aid in image capture.

In one aspect, the third vision system 170 may examine the part stack 144 in position at the stitching machine 130 and determine a position of the part stack 144 relative to the stitching machine 130 as it relates to a preset stitching pattern. A preset stitching pattern may be based upon the nature of the shoe parts comprising the part stack 144 being stitched (that is, known information regarding the type of shoe part assembly being processed, the design of the shoe part assembly being processed, the materials comprising the shoe parts being stitched together, and the like). At times, however, for instance when there is a defect in one of the shoe parts comprising a part stack or when there has been some amount of slippage during positioning of the shoe parts and/or the part stack during assembly and prior to stitching, adjustments to the preset stitching pattern may be desired.

Figure 28C:
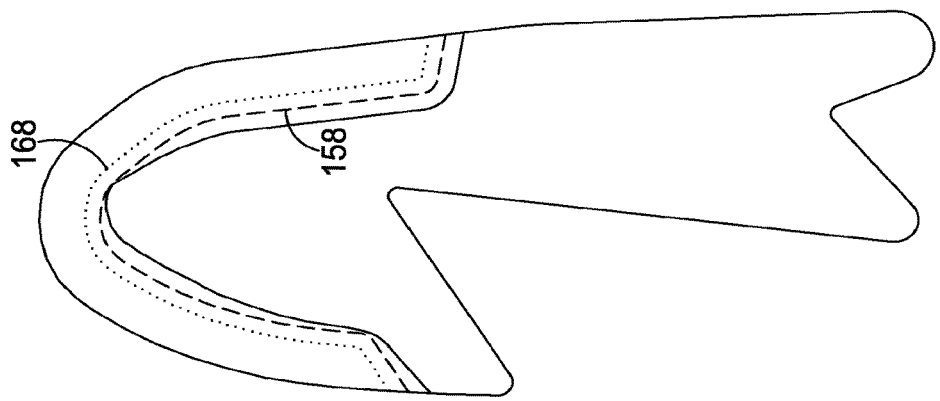
FIG. 28C is a schematic diagram illustrating an adjusted stitching pattern relative to the preset stitching pattern, the adjustments having been made based upon feedback received from the third vision system, in accordance with aspects of the present invention.
Figure 28B:
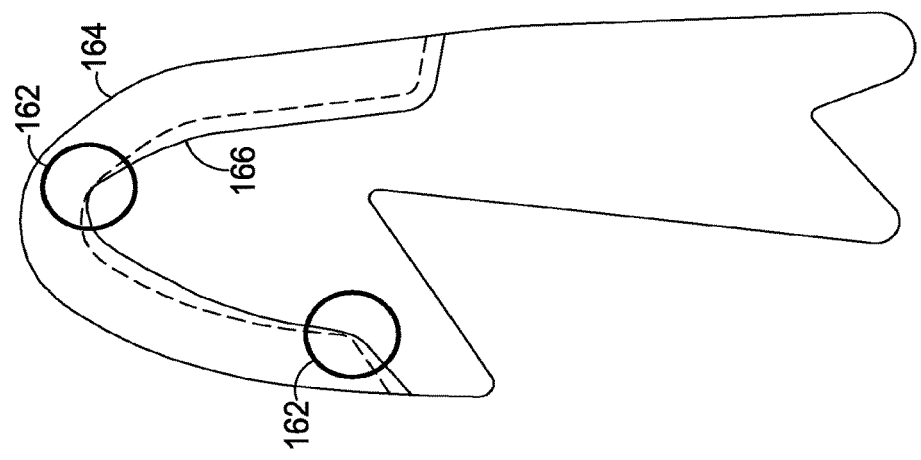
FIG. 28B is a schematic diagram illustrating a slightly deformed second shoe part with the preset stitching pattern superimposed there over, in accordance with aspects of the present invention.
Figure 28A:
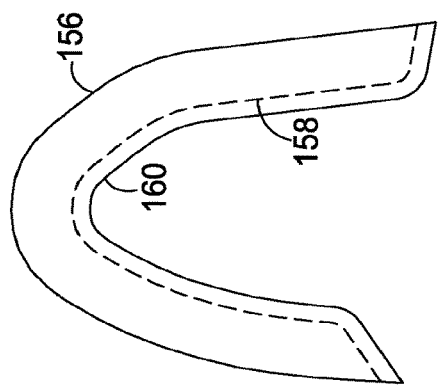
FIG. 28A is a schematic diagram illustrating a preset stitching pattern, in accordance with aspects of the present invention.

With reference to FIG. 28A, an exemplary non-base shoe part 156 is illustrated with a preset stitching pattern 158 shown in dashed line thereon. FIG. 28A represents an ideal situation for the shoe part 156 shown—a situation in which the preset stitching pattern 158 provides for stitching along the appropriate part contours while maintaining the appropriate offset of stitching to allow for a consistent margin between the edge 160 of the shoe part 156 and the preset stitching pattern 158. FIG. 28B represents a situation wherein there are a couple of defects 162 in the illustrated non-base shoe part 164 that would cause stitching in accordance with the preset stitching pattern 158 to create stitches inappropriately offset based upon the edge 166 of the shoe part 164. Such inappropriate offsets may create a margin that, at worst, may render the stitched part stack unusable and, at best, may render the stitched part stack aesthetically unpleasing. As such, in aspects hereof, adjustments to the preset stitching pattern 158 may be made prior to the initiation of stitching to create an adjusted stitching path 168 that maintains the appropriate stitch offsets and margins. An adjusted stitching pattern 168 is illustrated in FIG. 28C. Such adjustments may be made utilizing the second vision system 145 of FIG. 19 and/or the third vision system illustrated in FIG. 25.

In an exemplary aspect, the adjustment of a preset stitching pattern may be accomplished with a series of steps. For example, one of the vision systems may capture an image of the part stack (either before being secured by the second conveyance mechanism or prior to being secured) for use in a pattern match function. The pattern match function may identify a location on the part stack for a first stitch position. The process may continue with a vision application performing an edge identification function that identifies an edge between layered materials within the part stack from which the margin is established. Once the edge is identified and a first stitch position is located, a computing process may identify a location for a subsequent stitch that is within a tolerable margin from the edge and satisfies the preset stitching pattern, in an exemplary aspect. It is further contemplated that additional steps may be implemented, for example, a preset stitching pattern may be logically projected onto the part stack as oriented by the located first stitch position. The position of subsequent stitches may be verified on the fly or ahead of time using vision software logic to ensure one or more of the stitches are within the tolerable margin.

Adjustments to the preset stitching pattern 158 may also be made after the initiation of stitching upon the third vision system 170 determining that continuing to stitch in accordance with the preset stitching pattern will lead to unacceptable and/or undesirable stitch offsets. In one aspect, the image-capturing device associated with the third vision system 170 may capture an image of the part stack 144 subsequent to each stitch and compare the image with a preset or already adjusted stitching pattern to determine if additional adjustments are necessary to maintain the desired margin of error. Adjustments may accordingly be made on a stitch-by-stitch basis to get the stitching back on track with the stitching pattern being utilized or may be made to the remainder of the stitching pattern as necessary.

Figure 27:
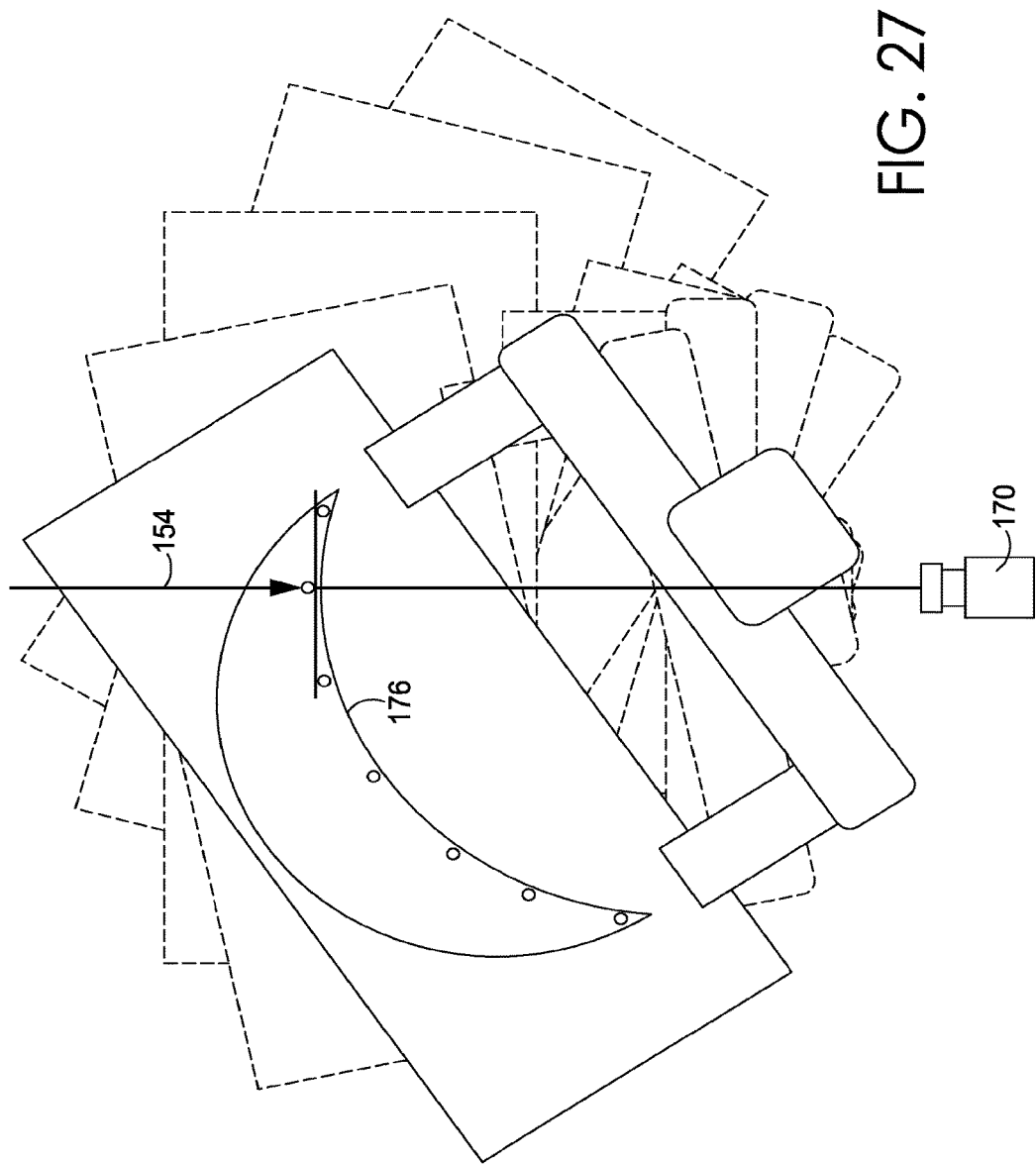
FIG. 27 is a schematic diagram illustrating motion of the second pick-up tool as it rotates during stitching to maintain a consistent angle of the stitching needle relative to a third vision system, in accordance with aspects of the present invention.

In one aspect, the second pick-up tool 128 rotates along a path that mimics the stitching path such that the edge line 176 of the shoe part being stitched remains perpendicular to the image-capture device of the third vision system 170, as shown in FIG. 27. In this way, an unobstructed view from the image-capture device of the third vision system 170 to the needle 154 of the stitching machine 130 is maintained to better insure maintenance of the appropriate stitch offsets and margins during stitching. However, it is contemplated that the third vision system implementation as described may be omitted, at least in part, in exemplary aspects. For example, if a second vision system is used to determine a stitching path for the part stack, the third vision system may not be used in general or may not be used for stitch path identification in some examples. Therefore, it is contemplated that some aspects may leverage a third vision system and some aspects may omit a third vision system as provided herein. In yet additional aspect, the third vision system may be used for positional or orientation identifications of the part stack or other features/components but not used for stitch path determination. For example.

Figure 29:
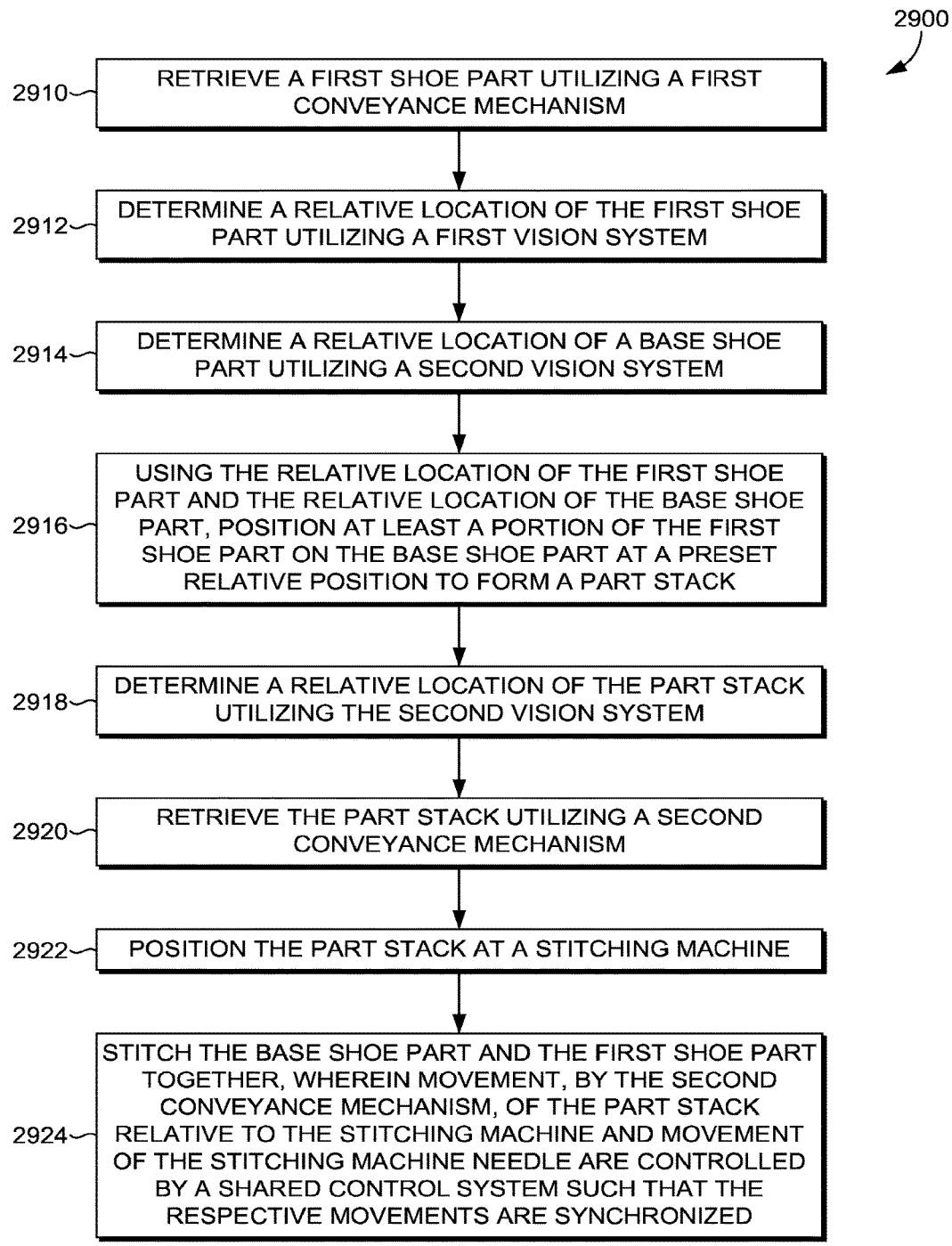
FIGS. 29 and 30 are flow diagrams illustrating methods for manufacturing shoe parts in an automated manner, in accordance with aspects of the present invention.

Turning now to FIG. 29, a flow diagram is illustrated depicting an exemplary method 2900 for manufacturing shoe parts in an automated manner, in accordance with aspects of the present invention. As indicated at block 2910, a first shoe part may be retrieved utilizing a first conveyance mechanism, e.g., the first conveyance mechanism 118 of FIG. 3, which includes a first pick-up tool, e.g., the first pick-up tool 122 of FIG. 3. As indicated at block 2912, a relative position of the first shoe part to the first pick-up tool may be determined utilizing a first vision system, for instance, the first vision system 124 of FIG. 3. A position of a base shoe part relative to a stacking surface may be determined utilizing a second vision system (e.g., the second vision system 146 of FIG. 3), as indicated at block 2914. As indicated at block 2916, using the position of the first shoe part relative to the first pick-up tool determined by the first vision system and the position of the base shoe part relative to the stacking surface determined by the second vision system, the first shoe part may be situated at the stacking surface such that at least a portion of the first shoe part overlaps at least a portion of the base shoe part at a preset relative position to form a part stack. As indicated at block 2918, utilizing the second vision system, a position of the part stack relative to the stacking surface may be determined. As indicated at block 2920, the part stack may be retrieved from the stacking surface utilizing a second conveyance mechanism (e.g., the second conveyance mechanism 120 of FIG. 3) that includes a second pick-up tool (e.g., the second pick-up tool 128 of FIG. 3). As indicated at block 2922, the part stack may be situated at a stitching machine (for instance, the stitching machine 130 of FIG. 3), the stitching machine having a needle associated therewith. The base shoe part and the first shoe part may be stitched together, as indicated at block 2924. In one aspect, movement, by the second conveyance mechanism, of the part stack relative to the stitching machine and movement of the stitching machine needle are controlled by a shared control system, e.g., the shared control system 172 of FIG. 3, such that the respective movements are synchronized.

Figure 30:
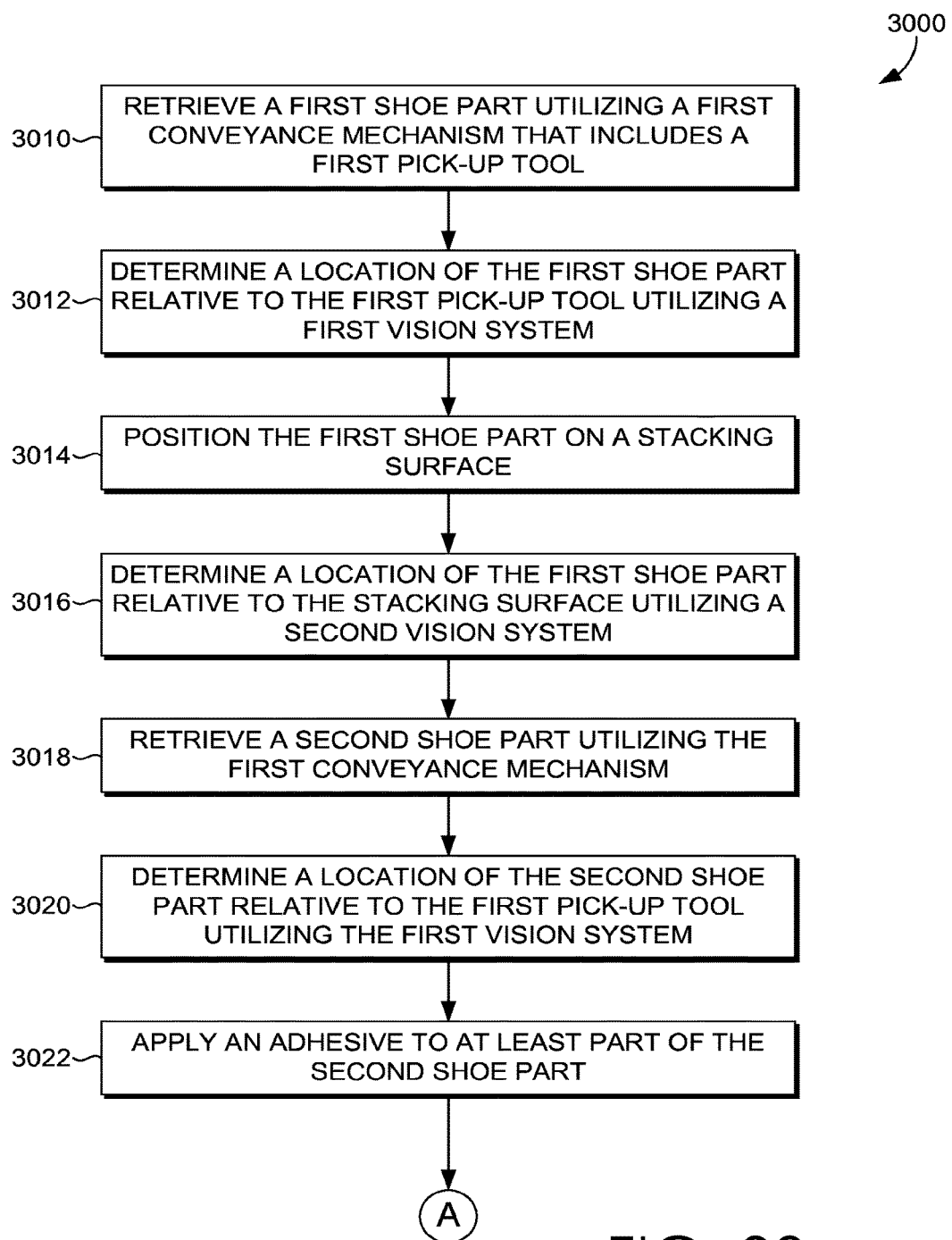
Figure 30:
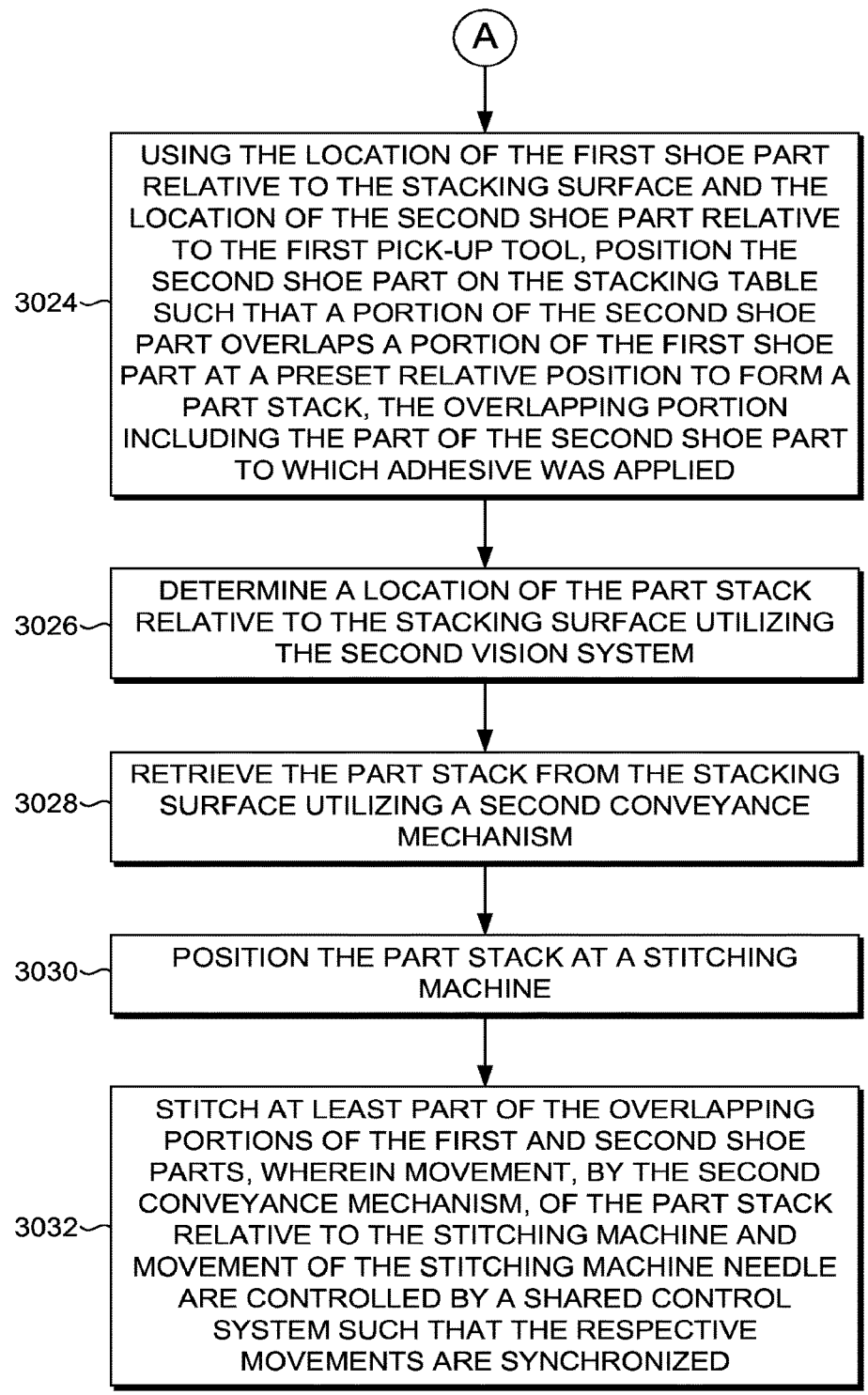

Turning now to FIG. 30, a flow diagram is illustrated depicting another exemplary method 3000 for manufacturing shoe parts in an automated manner, in accordance with aspects of the present invention. As indicated at block 3010, a first shoe part may be retrieved utilizing a first conveyance mechanism (e.g., the first conveyance mechanism 118 of FIG. 3), the first conveyance mechanism including a first pick-up tool (e.g., the first pick-up tool 122 of FIG. 3). As indicated at block 3012, utilizing a first vision system (for instance, the first vision system 124 of FIG. 3), a position of the first shoe part relative to the first pick-up tool may be determined. The first shoe part may be situated on a stacking surface, e.g., the stacking surface 126 of FIG. 3, as indicated at block 3014. As indicated at block 3016, a position of the first shoe part relative to the stacking surface may be determined utilizing a second vision system, e.g., the second vision system 146 of FIG. 3. As indicated at block 3018, a second shoe part may be retrieved utilizing the first conveyance mechanism (e.g., the first conveyance mechanism 118 of FIG. 3). Utilizing the first vision system, a position of the second shoe part relative to the first pick-up tool may be determined, as indicated at block 3020. As indicated at block 3022, an adhesive, e.g., a liquid adhesive, may be applied to at least part of the second shoe part to aid in at least temporarily adhering the first and second shoe parts together. As indicated at block 3024, using the position of the first shoe part relative to the stacking surface determined by the second vision system and the position of the second shoe part relative to the first pick-up tool determined by the first vision system, the second shoe part may be situated on the stacking table such that at least a portion of the second shoe part overlaps at least a portion of the first shoe part at a preset relative position to form a part stack. The portion of the second shoe part that overlaps the portion of the first shoe part may include the part of the second shoe part to which adhesive was applied. Utilizing the second vision system, a position of the part stack relative to the stacking surface may be determined, as indicated at block 3026. As indicated at block 3028, the part stack may be retrieved from the stacking surface utilizing a second conveyance mechanism, e.g., the second conveyance mechanism 120 of FIG. 3, having a second pick-up tool, e.g., the second pick-up tool 128 of FIG. 3. The part stack may be situated at a stitching machine (for instance, the stitching machine 130 of FIG. 3), the stitching machine having a needle associated therewith, as indicated at block 3030. As indicated at block 3032, at least a part of the overlapping portions of the first shoe part and the second shoe part may be stitched together. In one aspect, movement, by the second conveyance mechanism, of the part stack relative to the stitching machine and movement of the needle associated with the stitching machine may be controlled by a shared control system (e.g., the shared control system 172 of FIG. 3) such that the respective movements are synchronized.

Once a plurality of shoe parts has been assembled and stitched together, various other shoe-manufacturing processes may be carried out by the system 100 and/or other complementary systems (not shown). For instance, an upper, a midsole, and an outsole may be assembled, quality checks may be performed. Moreover, other parts may be added to the assembly, such as laces or certain aesthetic elements. In addition, processes (e.g., packaging, cleaning, etc.) may be carried out by the system 100 (and/or a complementary system) that prepare a shoe to be transported or shipped to another location.

Figure 31:
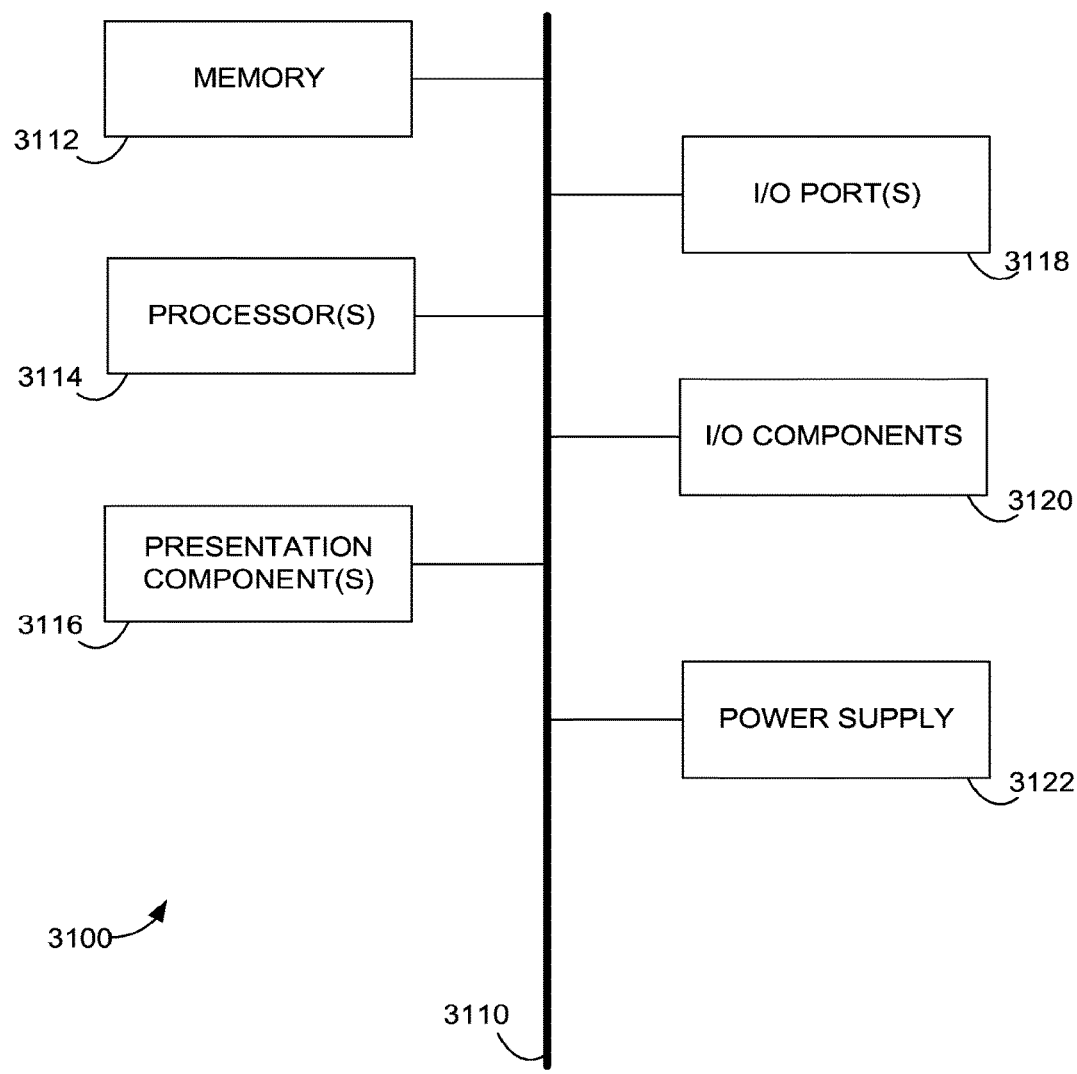
FIG. 31 is a block diagram illustrating an exemplary computing device that may be used with systems and methods in accordance with aspects of the present invention.

As described above, the technology herein described may comprise, among other things, a method, a system, or a set of instructions stored on one or more computer-readable media. Information stored on the computer-readable media may be used to direct operations of a computing device, and an exemplary computing device 3100 is depicted in FIG. 31. The computing device 3100 is but one example of a suitable computing system and is not intended to suggest any limitation as to the scope of use or functionality of inventive aspects hereof. Neither should the computing system 3100 be interpreted as having any dependency or requirement relating to any one or combination of components illustrated. Moreover, aspects of the invention may also be practiced in distributed computing systems where tasks are performed by separate or remote-processing devices that are linked through a communications network. Exemplary computing systems may include personal computers, distributed computing systems, programmable logic controllers, and other industrial computing systems, for example.

The computing device 3100 has a bus 3110 that directly or indirectly couples the following components: memory 3112, one or more processors 3114, one or more presentation components 3116, input/output (I/O) ports 3118, I/O components 3120, and an illustrative power supply 3122. The bus 3110 represents what may be one or more busses (such as an address bus, data bus, or combination thereof). Although the various blocks of FIG. 31 are shown with lines for the sake of clarity, in reality, delineating various components is not so clear, and metaphorically, the lines would move accurately be grey and fuzzy. For example, processors may have memory.

The computing device 3100 typically includes a variety of computer-readable media. Computer-readable media can be any available media that can be accessed by the computing system 3100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data.

Computer storage media includes, by way of example, and not limitation, Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of communications media.

The computing device 3100 is depicted to have one or more processors 3114 that read data from various entities such as memory 3112 or I/O components 1320. Exemplary data that is read by a processor may be comprised of computer code or machine-useable instructions, which may be computer-executable instructions such as program modules, being executed by a computer or other machine. Generally, program modules such as routines, programs, objects, components, data structures, etc., refer to code that perform particular tasks or implement particular abstract data types.

The presentation components 3116 present data indications to a user or other device. Exemplary presentation components are a display device, speaker, printing component, light-emitting component, etc. The I/O ports 3118 allow the computing device 3100 to be logically coupled to other devices including the I/O components 3120, some of which may be built in.

In the context of shoe manufacturing, a computing device 3100 may be used to determine operations of various shoe-manufacturing tools. For example, a computing device may be used to control a part pick-up tool (e.g., the first or second part pick-up tools shown in FIG. 3) or a conveyor that transfers shoe parts from one location to another (e.g., the first or second conveyance mechanisms shown in FIG. 3). In addition, a computing device may be used to control a part-attachment tool that attaches (e.g., adheres, stitches, etc.) one shoe part to another shoe part.

Many different arrangements of the various components depicted, as well a components not shown, are possible without departing from the scope of the claims below. Exemplary aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated to be within the scope of the claims.

What is claimed is:

1. An adjustable surface for use in the automated manufacture of shoe parts, the surface comprising:
   a support structure having a substantially planar support surface; and
   a plurality of adjustable members coupled with the support structure, each of the plurality of adjustable members being independently adjustable in at least one direction relative to the substantially planar support surface, the at least one direction comprising a direction that is parallel to the substantially planar support surface, each of the plurality of adjustable members having an extended position and a retracted position, wherein when the plurality of adjustable members are in the extended position, the plurality of members form one substantially planar top surface above the substantially planar support surface.

2. The adjustable surface of claim 1, wherein the plurality of adjustable members are aligned substantially parallel to one another, and wherein respective longitudinal axes of the plurality adjustable members are perpendicular to a plane of the substantially planar support surface.

3. The adjustable surface of claim 1, wherein adjustments made to a portion of the plurality of adjustable members generates openings for receiving one or more tools used in the automated manufacture of shoe parts.

4. The adjustable surface of claim 1, wherein the plurality of adjustable members are arranged in a grid structure comprised of a plurality of columns and a plurality of rows forming a matrix of the plurality of adjustable members.

5. The adjustable surface of claim 1, wherein each of the plurality of adjustable members is independently adjustable via at least one of pneumatics, hydraulics, or electromagnetics.

6. The adjustable surface of claim 1, further comprising a computing system that instructs adjustment of each of the plurality of adjustable members independently of one another.

7. The adjustable surface of claim 1, wherein when a first portion of the plurality of the adjustable members are in the retracted position and a second portion of the plurality of the adjustable members are in the extended position, the first portion forms an opening configured to receive a tool beneath the substantially planar top surface and concurrently the second portion forms the substantially planar top surface configured to support a part to be manipulated by the tool.

\* \* \* \* \*